(12) United States Patent
Hwang et al.

(10) Patent No.: US 12,238,759 B2
(45) Date of Patent: Feb. 25, 2025

(54) METHOD AND APPARATUS FOR PERFORMING PRIORITIZATION PROCEDURE IN NR V2X

(71) Applicant: LG ELECTRONICS INC., Seoul (KR)

(72) Inventors: Daesung Hwang, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 291 days.

(21) Appl. No.: 17/575,271

(22) Filed: Jan. 13, 2022

(65) Prior Publication Data
US 2022/0287052 A1    Sep. 8, 2022

Related U.S. Application Data

(60) Provisional application No. 63/175,546, filed on Apr. 15, 2021, provisional application No. 63/175,034, (Continued)

(30) Foreign Application Priority Data

| Jan. 14, 2021 | (KR) | 10-2021-0005528 |
|---|---|---|
| Feb. 4, 2021 | (KR) | 10-2021-0016176 |

(Continued)

(51) Int. Cl.
*H04W 72/566* (2023.01)
*H04L 1/1812* (2023.01)
(Continued)

(52) U.S. Cl.
CPC ......... *H04W 72/569* (2023.01); *H04L 1/1812* (2013.01); *H04L 5/0053* (2013.01);
(Continued)

(58) Field of Classification Search
None
See application file for complete search history.

(56) References Cited

U.S. PATENT DOCUMENTS

| 11,252,753 B2* | 2/2022 | Chen .................. H04L 1/1887 |
|---|---|---|
| 11,902,940 B2* | 2/2024 | Li ........................ H04W 80/02 |

(Continued)

FOREIGN PATENT DOCUMENTS

| CN | 111356240 A | 6/2020 |
|---|---|---|
| CN | 111615184 A | 9/2020 |

(Continued)

OTHER PUBLICATIONS

Huawei, HiSilicon, "Remaining details of physical layer procedures for sidelink", 3GPP TSG RAN WG1 Meeting #100e-bis, Apr. 20-30, 2020, R1-2001555.

(Continued)

*Primary Examiner* — Phirin Sam
(74) *Attorney, Agent, or Firm* — BRYAN CAVE LEIGHTON PAISNER LLP

(57) ABSTRACT

Provided are a method for performing wireless communication by a first device and an apparatus supporting same. The method may comprise: receiving, from a base station, information related to a first physical uplink control channel (PUCCH) for a sidelink (SL) hybrid automatic repeat request (HARQ)-acknowledgment (ACK) report; transmitting, to a second device through a physical sidelink control channel (PSCCH), a first sidelink control channel (SCI) for scheduling of a physical sidelink shared channel (PSSCH) and a second SCI; transmitting, to the second device through the PSSCH, the second SCI and data; generating the SL HARQ-ACK report for the data.

20 Claims, 18 Drawing Sheets

Related U.S. Application Data filed on Apr. 14, 2021, provisional application No. 63/143,660, filed on Jan. 29, 2021.

(30) Foreign Application Priority Data

| Mar. 31, 2021 | (KR) | ........................ 10-2021-0041762 |
| Apr. 16, 2021 | (KR) | ........................ 10-2021-0049749 |
| May 10, 2021  | (KR) | ........................ 10-2021-0060181 |

(51) Int. Cl.

| *H04L 5/00*     | (2006.01) |
| *H04W 72/0446*  | (2023.01) |
| *H04W 72/1263*  | (2023.01) |
| *H04W 72/20*    | (2023.01) |
| *H04W 92/18*    | (2009.01) |

(52) U.S. Cl.
CPC ... *H04W 72/0446* (2013.01); *H04W 72/1263* (2013.01); *H04W 72/20* (2023.01); *H04W 92/18* (2013.01)

(56) References Cited

U.S. PATENT DOCUMENTS

| 2019/0261361 | A1  | 8/2019  | Xiong et al. |           |
| 2020/0170058 | A1* | 5/2020  | Yoon ........................ | H04W 76/14 |
| 2020/0228247 | A1  | 7/2020  | Guo et al. |           |
| 2020/0351855 | A1  | 11/2020 | Kung et al. |           |
| 2020/0412494 | A1  | 12/2020 | Wu et al. |           |
| 2021/0028891 | A1* | 1/2021  | Zhou ........................ | H04W 4/40 |
| 2021/0105126 | A1* | 4/2021  | Yi ............................ | H04L 1/1671 |
| 2021/0297221 | A1* | 9/2021  | Lee .......................... | H04L 5/0053 |
| 2022/0225290 | A1* | 7/2022  | Ganesan ............... | H04L 5/0064 |
| 2022/0304001 | A1* | 9/2022  | Lee .................... | H04W 72/0446 |
| 2023/0073497 | A1* | 3/2023  | Yi ............................ | H04W 72/23 |
| 2023/0077372 | A1* | 3/2023  | Liu .................... | H04W 72/1263 370/329 |
| 2024/0089064 | A1* | 3/2024  | Cirik ...................... | H04L 5/0094 |

FOREIGN PATENT DOCUMENTS

| CN | 111727575 A    | 9/2020  |
| CN | 111818659 A    | 10/2020 |
| CN | 111837437 A    | 10/2020 |
| WO | 2020071783 A1  | 4/2020  |
| WO | 2020222514 A1  | 5/2020  |
| WO | 2020/144261 A1 | 7/2020  |
| WO | 2020153812 A1  | 7/2020  |
| WO | 2020153821 A1  | 7/2020  |
| WO | 2020197333 A1  | 10/2020 |

OTHER PUBLICATIONS

CMCC, "Remaining issues on physical layer procedures for sidelink", 3GPP TSG RAN WG1 #101, May 25-Jun. 5, 2020, R1-2003952.
R1-2008533: 3GPP TSG RAN WG1 #103, e-Meeting, Oct. 26-Nov. 13, 2020, NTT Docomo, Inc. "Maintenance for sidelink-related collision" (9 Pages).
R1-2008669: 3GPP TSG RAN WG1 #103, e-Meeting, Oct. 26-Nov. 13, 2020, NTT Docomo, vivo, "Remaining issues on physical layer procedure for NR sidelink" (8 Pages).
R1-2007776: 3GPP TSG RAN WG1 #103, e-Meeting, Oct. 26-Nov. 13, 2020, LG Electronics, "Discussion on essential corrections in physical layer procedures" (10 Pages).
R1-2001551: 3GPP TSG RAN WG1 #103bis-e-Meeting, Apr. 20, 2020, Huawei, HiSilicon, "Remaining details of sidelink resource allocation mode 1," (19 Pages).
LG Electronics "Discussion on physical layer procedures for NR sidelink," 3GPP TSG RAN WG1 Meeting #98, R1-1908906, 19 pages, Aug. 2019.
"Status Report to TSG," 3GPP TSG RAN meeting #88e, RP-200854, 10 pages, Jul. 2020.
LG Electronics, "Discussion on essential corrections in physical layer procedure", R1-2100516, 3GPP TSG RAN WG1 Meeting #104-e, e-Meeting, Jan. 25-Feb. 5, 2021.
Vivo, "Maintenance on NR sidelink synchronization and procedures", R1-2100412, 3GPP TSG RAN WG1 #104, e-Meeting, Jan. 25-Feb. 5, 2021.
Huawei, HiSilicon "Sidelink resource allocation moded 1," GPP TSG RAN WG1 Meeting #99, R1-1911883, Nov. 2019.

\* cited by examiner

METHOD AND APPARATUS FOR PERFORMING PRIORITIZATION PROCEDURE IN NR V2X

CROSS-REFERENCE TO RELATED APPLICATIONS

Pursuant to 35 U.S.C. § 119, this application claims the benefit of Korean Patent Applications Nos. 10-2021-0005528 filed on Jan. 14, 2021, 10-2021-0016176 filed on Feb. 4, 2021, 10-2021-0041762 filed on Mar. 31, 2021, 10-2021-0049749 filed on Apr. 16, 2021 and 10-2021-0060181 filed on May 10, 2021 and U.S. Provisional Patent Application Nos. 63/143,660 filed on Jan. 29, 2021, 63/175,034 filed on Apr. 14, 2021 and 63/175,546 filed on Apr. 15, 2021, the contents of which are all hereby incorporated by reference herein in their entirety

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

Thereafter, regarding V2X communication, various V2X scenarios are proposed in NR. For example, the various V2X scenarios may include vehicle platooning, advanced driving, extended sensors, remote driving, or the like.

SUMMARY OF THE DISCLOSURE

Technical Objects

Meanwhile, when a PUCCH for a SL HARQ-ACK report and the eMBB PUCCH and/or the eMBB PUSCH and/or the URLLC PUCCH and/or the URLLC PUSCH overlap in time, it is necessary to define the operation of the UE. For example, if at least one of the SL PUCCH, the eMBB PUCCH, the eMBB PUSCH, the URLLC PUCCH, and/or the URLLC PUSCH partially or entirely overlaps in a time domain, the UE needs to determine a channel to transmit from among the channels.

Technical Solutions

In one embodiment, provided is a method for performing wireless communication by a first device. The method may comprise: receiving, from a base station, information related to a first physical uplink control channel (PUCCH) for a sidelink (SL) hybrid automatic repeat request (HARQ)-acknowledgment (ACK) report; transmitting, to a second device through a physical sidelink control channel (PSCCH), a first sidelink control channel (SCI) for scheduling of a physical sidelink shared channel (PSSCH) and a second SCI; transmitting, to the second device through the PSSCH, the second SCI and data; generating the SL HARQ-ACK report for the data; performing a procedure for prioritization between the first PUCCH and a second PUCCH, based on overlapping for the first PUCCH and the second PUCCH of a smaller priority index; performing a procedure for prioritization between the first PUCCH and a third PUCCH, based on overlapping for the first PUCCH and the third PUCCH of a larger priority index; selecting a first PUSCH in a procedure for resolving overlapping for at least one PUCCH without a SL HARQ-ACK report or at least one physical uplink shared channel (PUSCH); after resolving the overlapping for the at least one PUCCH without the SL HARQ-ACK report or the at least one PUSCH, determining overlapping for the first PUCCH and the first PUSCH; and transmitting, to the base station through the first PUSCH, the SL HARQ-ACK report, based on the first PUSCH of the smaller priority index which includes no uplink control information (UCI).

In one embodiment, provided is a first device configured to perform wireless communication. The first device may comprise: one or more memories storing instructions; one or more transceivers; and one or more processors connected to the one or more memories and the one or more transceivers. The one or more processors may execute the instructions to: receive, from a base station, information related to a first physical uplink control channel (PUCCH) for a sidelink (SL) hybrid automatic repeat request (HARQ)-acknowledgment (ACK) report; transmit, to a second device through a physical sidelink control channel (PSCCH), a first sidelink control channel (SCI) for scheduling of a physical sidelink shared channel (PSSCH) and a second SCI; transmit, to the second device through the PSSCH, the second SCI and data; generate the SL HARQ-ACK report for the data; perform a procedure for prioritization between the first PUCCH and a second PUCCH, based on overlapping for the first PUCCH and the second PUCCH of a smaller priority index; perform a procedure for prioritization between the first PUCCH and a third PUCCH, based on overlapping for the first PUCCH and the third PUCCH of a larger priority index; select a first PUSCH in a procedure for resolving overlapping for at least one PUCCH without a SL HARQ-ACK report or at least one physical uplink shared channel (PUSCH); after resolving the overlapping for the at least one PUCCH without the SL HARQ-ACK report or the at least one PUSCH, determine overlapping for the first PUCCH and the first PUSCH; and transmit, to the base station through the first PUSCH, the SL HARQ-ACK report, based on the first PUSCH of the smaller priority index which includes no uplink control information (UCI).

Effects of the Disclosure

The user equipment (UE) can efficiently perform SL communication.

DESCRIPTION OF EXEMPLARY EMBODIMENTS

Figure 1:
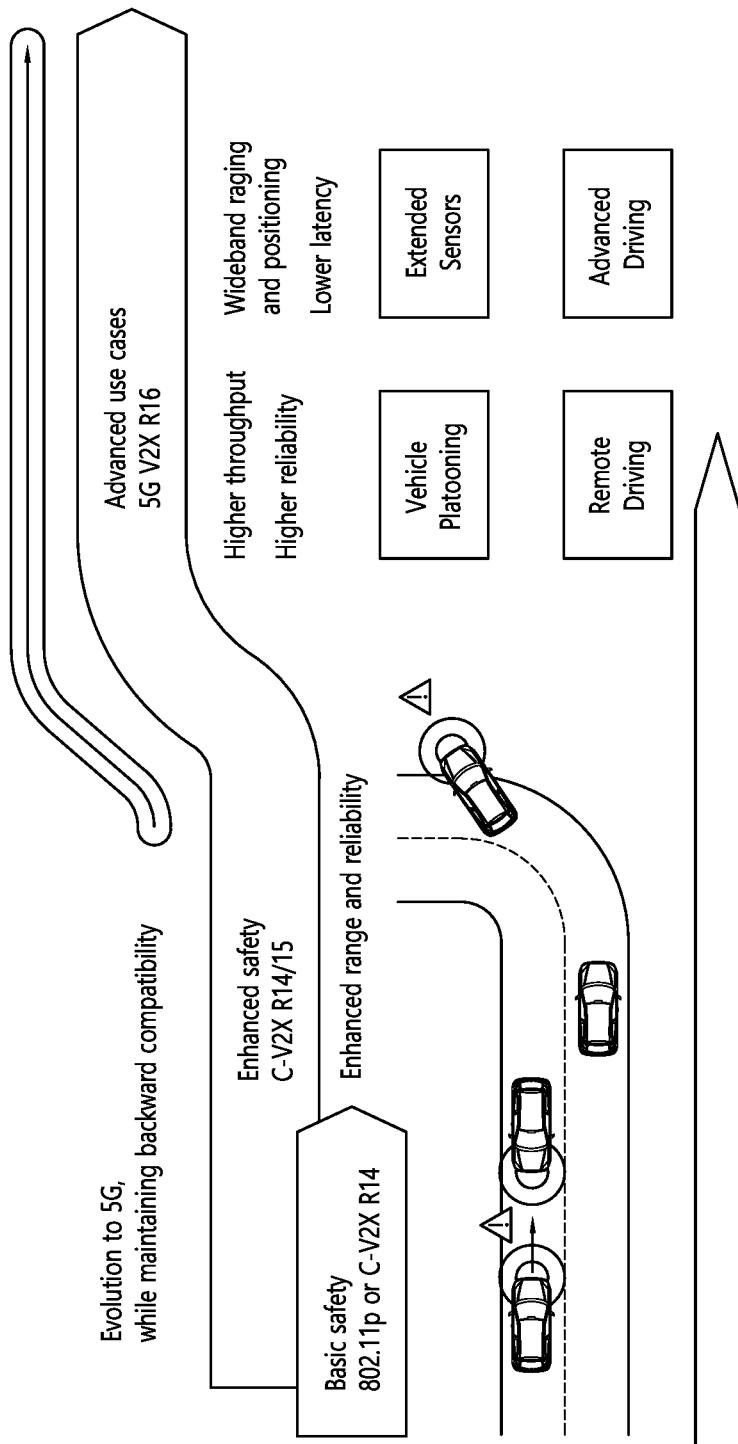
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
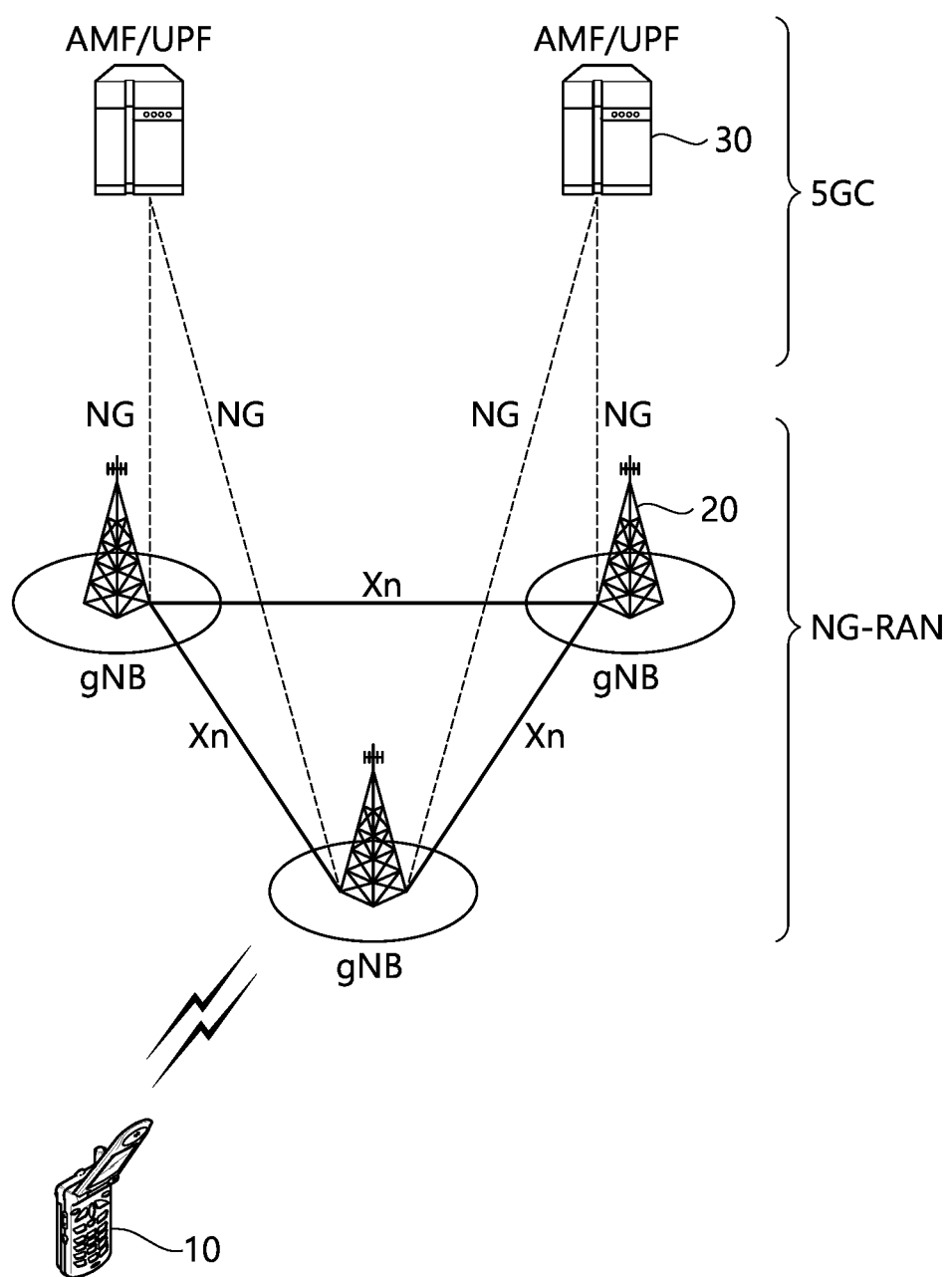
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 3:
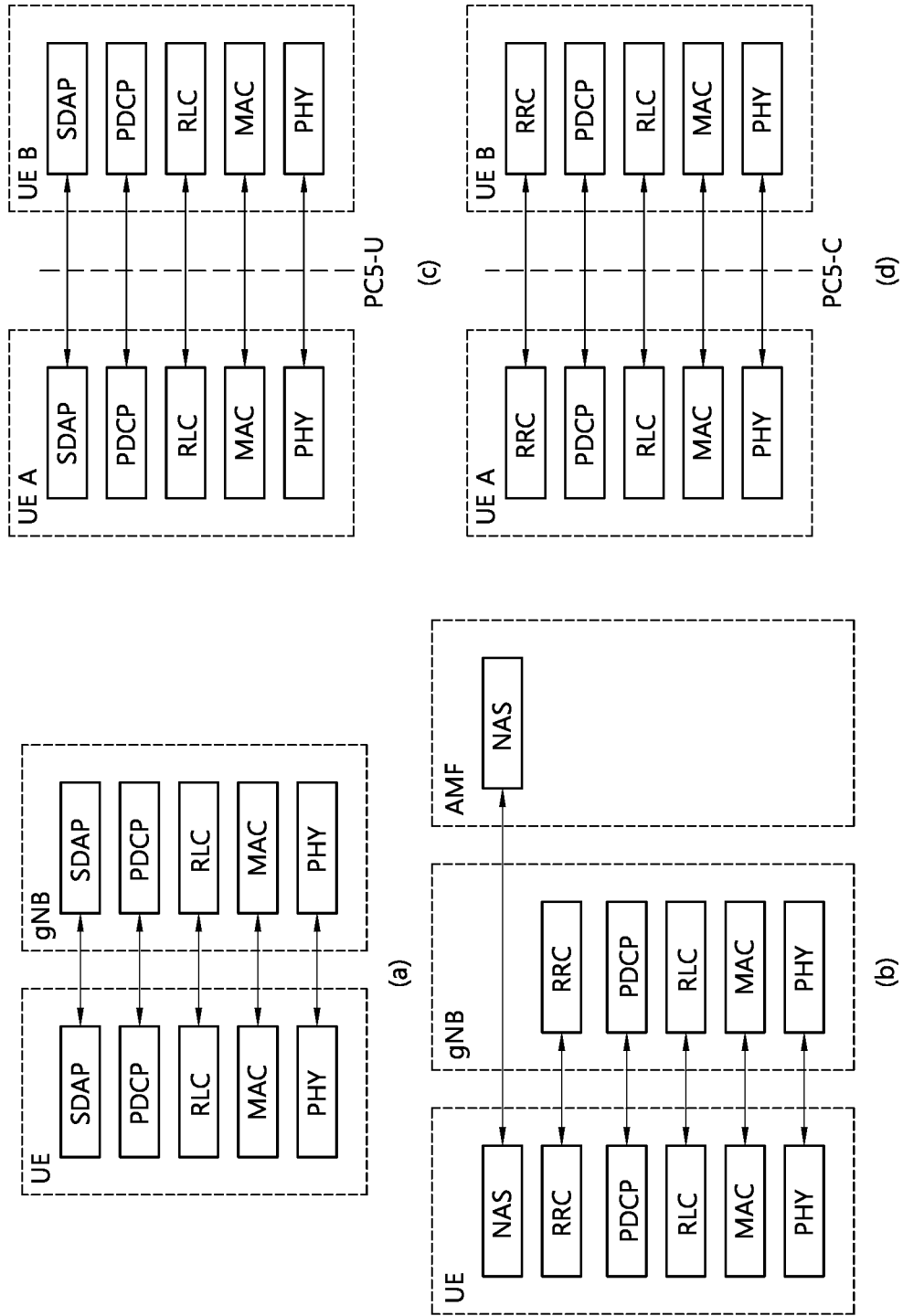
FIG. 3 shows a radio protocol architecture, based on an embodiment of the present disclosure.

FIG. 3 shows a radio protocol architecture, based on an embodiment of the present disclosure. The embodiment of FIG. 3 may be combined with various embodiments of the present disclosure. Specifically, (a) of FIG. 3 shows a radio protocol stack of a user plane for Uu communication, and (b) of FIG. 3 shows a radio protocol stack of a control plane for Uu communication. (c) of FIG. 3 shows a radio protocol stack of a user plane for SL communication, and (d) of FIG. 3 shows a radio protocol stack of a control plane for SL communication.

Referring to FIG. 3, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
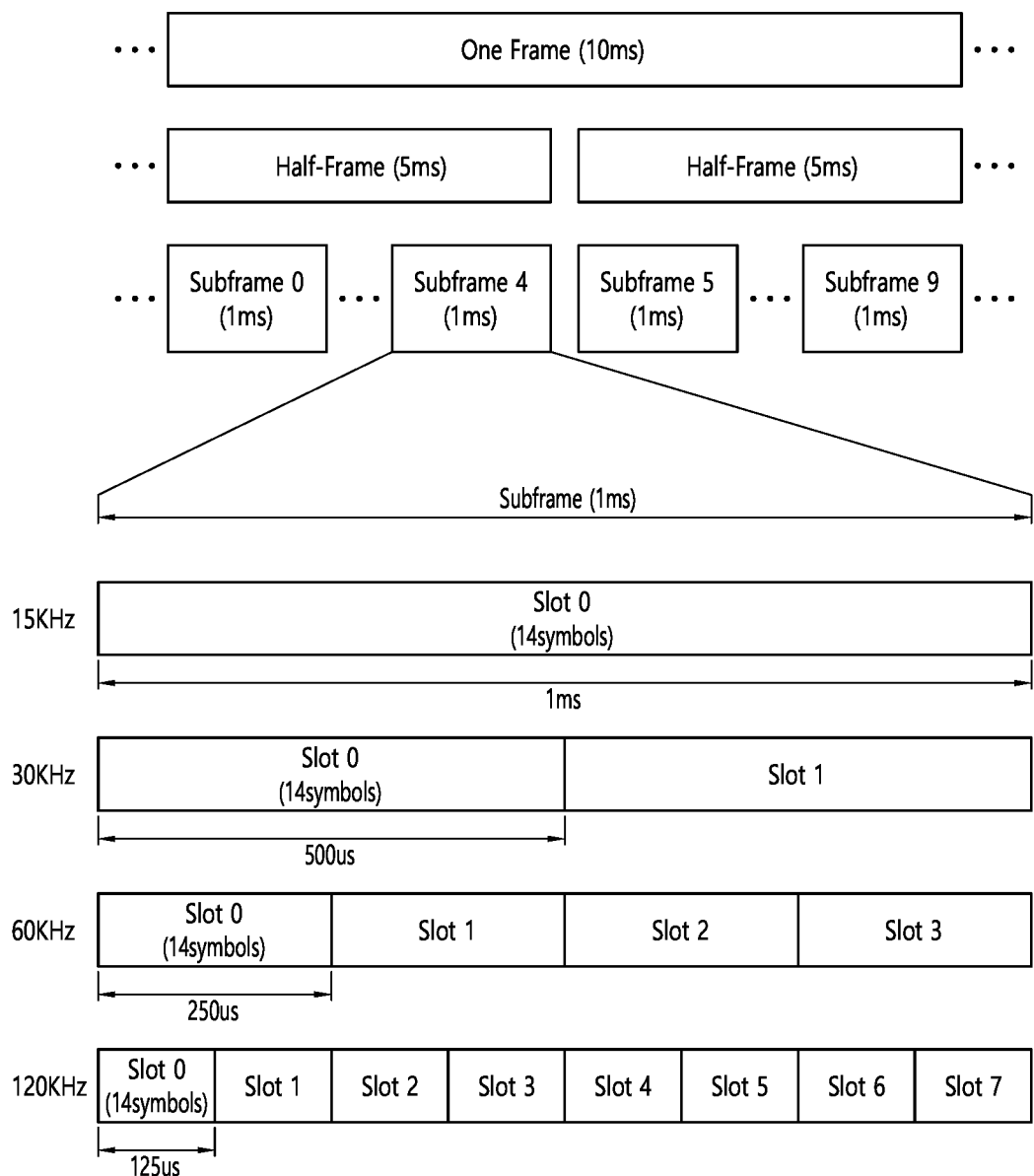
FIG. 4 shows a structure of a radio frame of an NR, based on an embodiment of the present disclosure.

FIG. 4 shows a structure of a radio frame of an NR, based on an embodiment of the present disclosure. The embodiment of FIG. 4 may be combined with various embodiments of the present disclosure.

Referring to FIG. 4, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS (15*2$^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS (15*2$^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
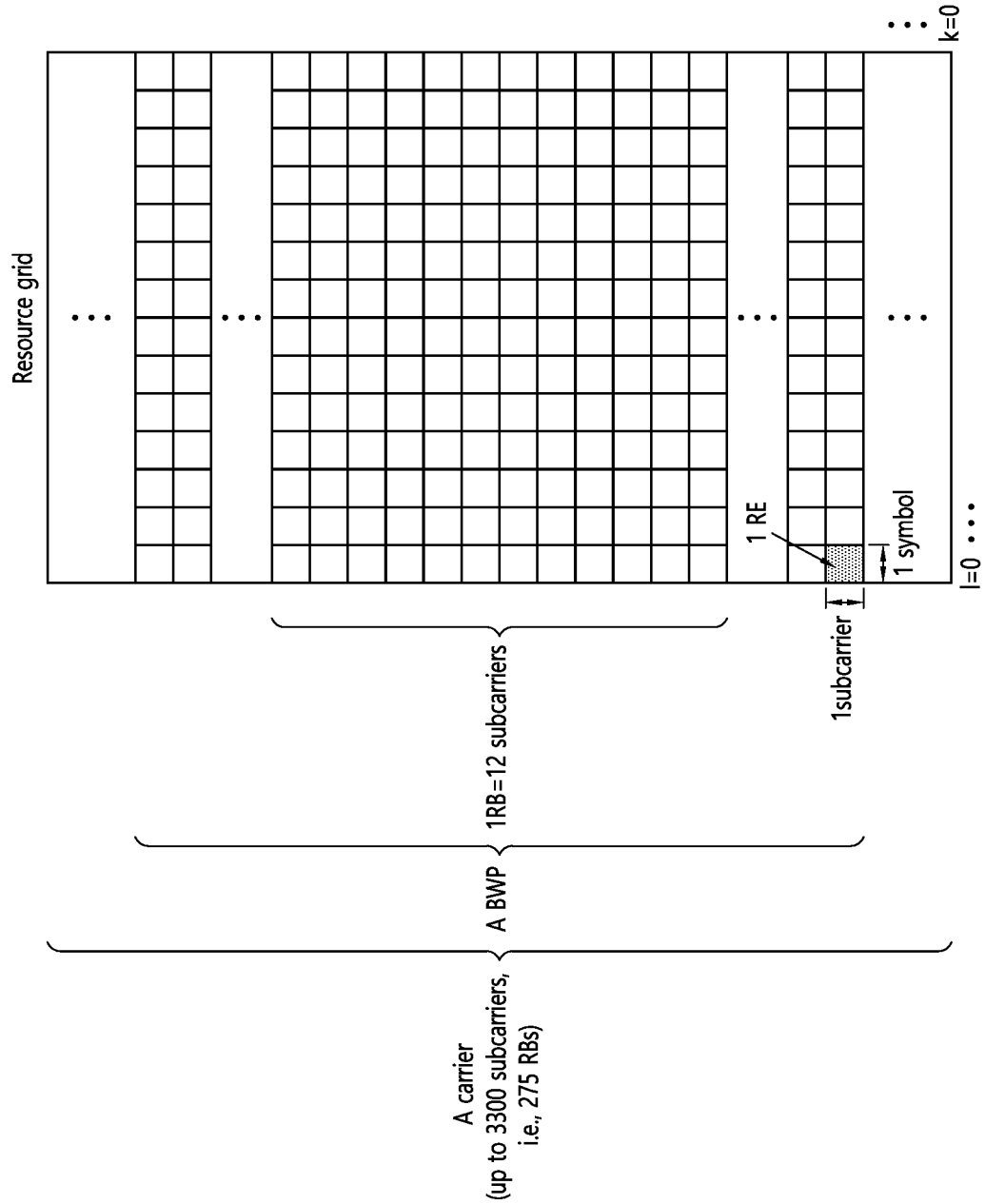
FIG. 5 shows a structure of a slot of an NR frame, based on an embodiment of the present disclosure.

FIG. 5 shows a structure of a slot of an NR frame, based on an embodiment of the present disclosure. The embodiment of FIG. 5 may be combined with various embodiments of the present disclosure.

Referring to FIG. 5, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P) RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 6:
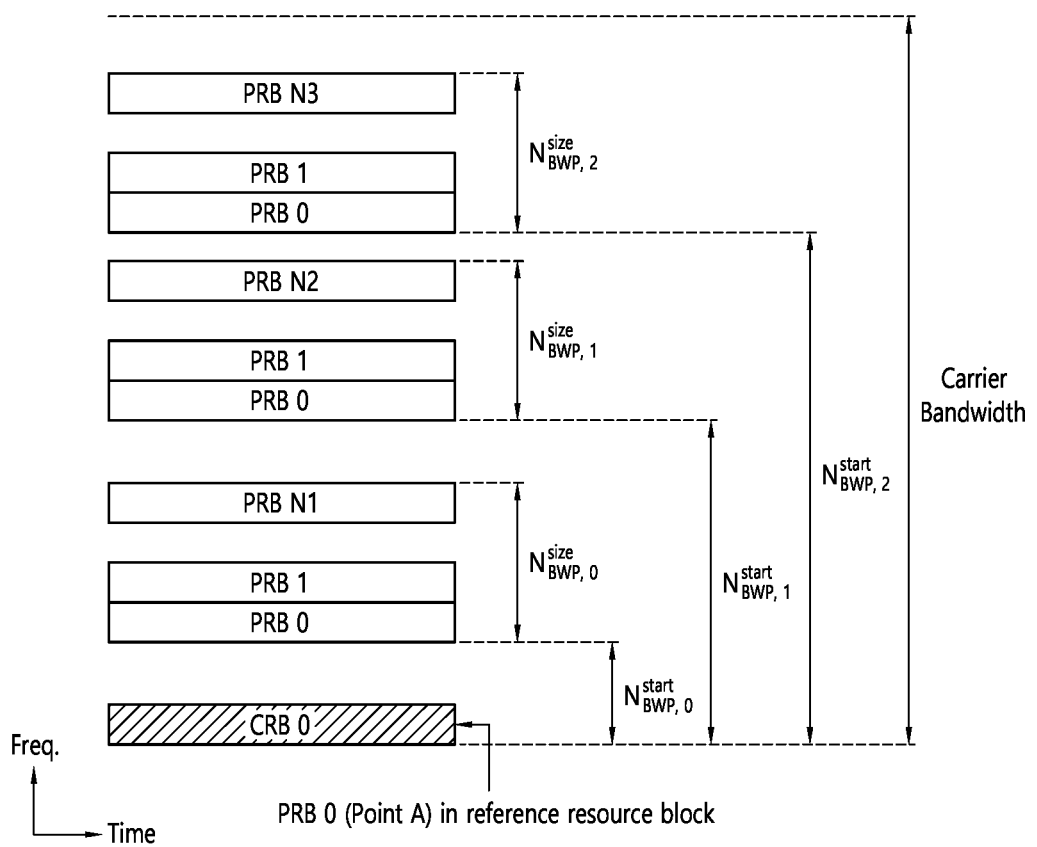
FIG. 6 shows an example of a BWP, based on an embodiment of the present disclosure.

FIG. 6 shows an example of a BWP, based on an embodiment of the present disclosure. The embodiment of FIG. 6 may be combined with various embodiments of the present disclosure. It is assumed in the embodiment of FIG. 6 that the number of BWPs is 3.

Referring to FIG. 6, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 7:
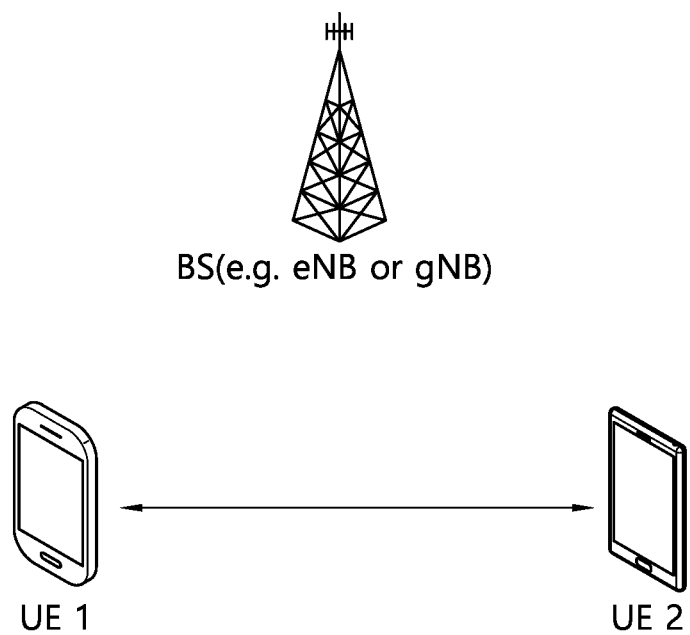
FIG. 7 shows a UE performing V2X or SL communication, based on an embodiment of the present disclosure.

FIG. 7 shows a UE performing V2X or SL communication, based on an embodiment of the present disclosure. The embodiment of FIG. 7 may be combined with various embodiments of the present disclosure.

Referring to FIG. 7, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 8:
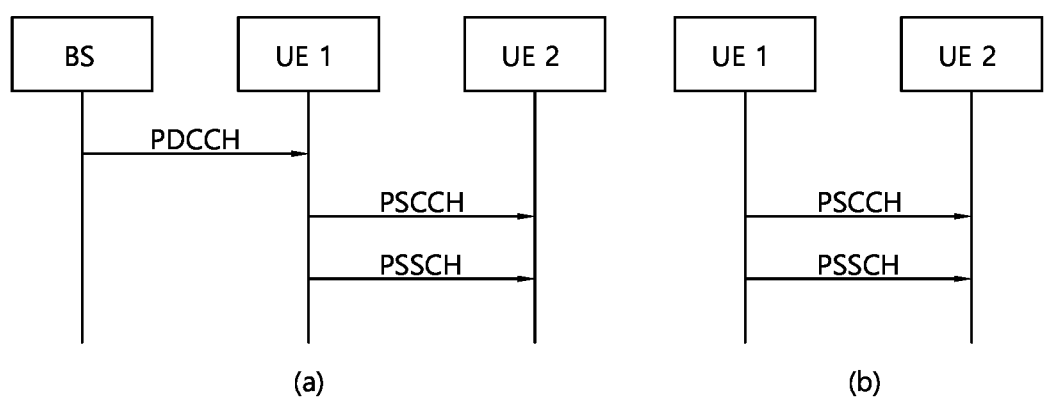
FIG. 8 shows a procedure of performing V2X or SL communication by a UE based on a transmission mode, based on an embodiment of the present disclosure.

FIG. 8 shows a procedure of performing V2X or SL communication by a UE based on a transmission mode, based on an embodiment of the present disclosure. The embodiment of FIG. 8 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 8 shows a UE operation related to an LTE transmission mode 1 or an LTE transmission mode 3. Alternatively, for example, (a) of FIG. 8 shows a UE operation related to an NR resource allocation mode 1. For example, the LTE transmission mode 1 may be applied to general SL communication, and the LTE transmission mode 3 may be applied to V2X communication.

For example, (b) of FIG. 8 shows a UE operation related to an LTE transmission mode 2 or an LTE transmission mode 4. Alternatively, for example, (b) of FIG. 8 shows a UE operation related to an NR resource allocation mode 2.

Referring to (a) of FIG. 8, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (e.g., downlink control information (DCI)) or RRC signaling (e.g., Configured Grant Type 1 or Configured Grant Type 2), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

For example, in the NR resource allocation mode 1, the UE may be provided or allocated with one or more SL transmission resources of one transport block (TB) from the BS through a dynamic grant. For example, the BS may provide the UE with resource for PSCCH and/or PSSCH transmission based on the dynamic grant. For example, a transmitting UE may report to the BS an SL hybrid automatic repeat request (HARQ) feedback received from a receiving UE. In this case, based on an indication within a PDCCH used by the BS to allocate a resource for SL transmission, a PUCCH resource and timing for reporting an SL HARQ feedback to the BS may be determined.

For example, DCI may include information related to a slot offset between DCI reception and first/initial SL transmission scheduled by the DCI. For example, a minimum gap between the DCI for scheduling the SL transmission resource and a first scheduled SL transmission resource may be not less than a processing time of a corresponding UE.

For example, in the NR resource allocation mode 1, for multiple SL transmissions, the UE may be periodically provided or allocated with a resource set from the BS through a configured grant. For example, the configured grant may include a configured grant type 1 or a configured grant type 2. For example, the UE may determine a TB to be transmitted in each of occasions indicated by a given configured grant.

For example, the BS may allocate an SL resource to the UE on the same carrier, or may allocate the SL resource to the UE on a different carrier.

Referring to (b) of FIG. 8, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 9:
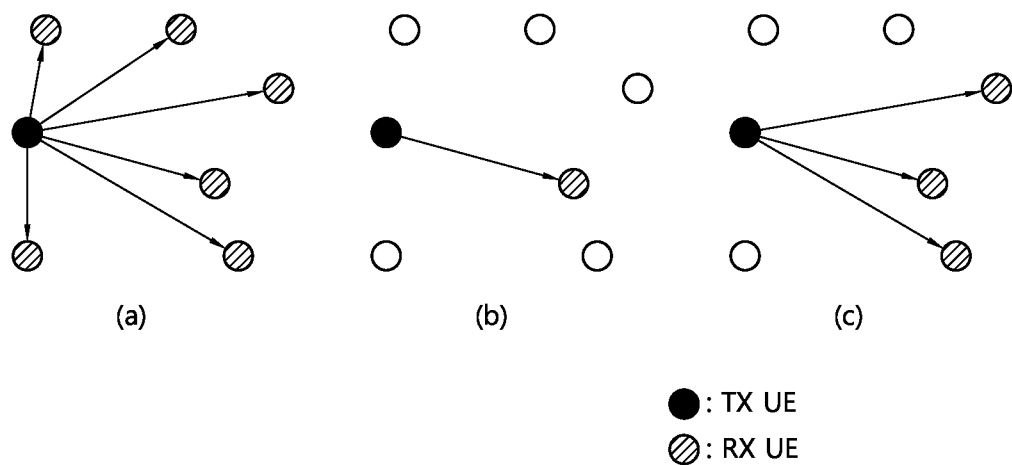
FIG. 9 shows three cast types, based on an embodiment of the present disclosure.

FIG. 9 shows three cast types, based on an embodiment of the present disclosure. The embodiment of FIG. 9 may be combined with various embodiments of the present disclosure. Specifically, (a) of FIG. 9 shows broadcast-type SL communication, (b) of FIG. 9 shows unicast type-SL communication, and (c) of FIG. 9 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hereinafter, a hybrid automatic repeat request (HARQ) procedure will be described.

In case of SL unicast and groupcast, HARQ feedback and HARQ combining in the physical layer may be supported. For example, when a receiving UE operates in a resource allocation mode 1 or 2, the receiving UE may receive the PSSCH from a transmitting UE, and the receiving UE may transmit HARQ feedback for the PSSCH to the transmitting UE by using a sidelink feedback control information (SFCI) format through a physical sidelink feedback channel (PSFCH).

For example, the SL HARQ feedback may be enabled for unicast. In this case, in a non-code block group (non-CBG) operation, if the receiving UE decodes a PSCCH of which a target is the receiving UE and if the receiving UE successfully decodes a transport block related to the PSCCH, the receiving UE may generate HARQ-ACK. In addition, the receiving UE may transmit the HARQ-ACK to the transmitting UE. Otherwise, if the receiving UE cannot successfully decode the transport block after decoding the PSCCH of which the target is the receiving UE, the receiving UE may generate the HARQ-NACK. In addition, the receiving UE may transmit HARQ-NACK to the transmitting UE.

For example, the SL HARQ feedback may be enabled for groupcast. For example, in the non-CBG operation, two HARQ feedback options may be supported for groupcast.

(1) Groupcast option 1: After the receiving UE decodes the PSCCH of which the target is the receiving UE, if the receiving UE fails in decoding of a transport block related to the PSCCH, the receiving UE may transmit HARQ-NACK to the transmitting UE through a PSFCH. Otherwise, if the receiving UE decodes the PSCCH of which the target is the receiving UE and if the receiving UE successfully decodes the transport block related to the PSCCH, the receiving UE may not transmit the HARQ-ACK to the transmitting UE.

(2) Groupcast option 2: After the receiving UE decodes the PSCCH of which the target is the receiving UE, if the receiving UE fails in decoding of the transport block related to the PSCCH, the receiving UE may transmit HARQ- NACK to the transmitting UE through the PSFCH. In addition, if the receiving UE decodes the PSCCH of which the target is the receiving UE and if the receiving UE successfully decodes the transport block related to the PSCCH, the receiving UE may transmit the HARQ-ACK to the transmitting UE through the PSFCH.

For example, if the groupcast option 1 is used in the SL HARQ feedback, all UEs performing groupcast communication may share a PSFCH resource. For example, UEs belonging to the same group may transmit HARQ feedback by using the same PSFCH resource.

For example, if the groupcast option 2 is used in the SL HARQ feedback, each UE performing groupcast communication may use a different PSFCH resource for HARQ feedback transmission. For example, UEs belonging to the same group may transmit HARQ feedback by using different PSFCH resources.

For example, when the SL HARQ feedback is enabled for groupcast, the receiving UE may determine whether to transmit the HARQ feedback to the transmitting UE based on a transmission-reception (TX-RX) distance and/or reference signal received power (RSRP).

For example, in the groupcast option 1, in case of the TX-RX distance-based HARQ feedback, if the TX-RX distance is less than or equal to a communication range requirement, the receiving UE may transmit HARQ feedback for the PSSCH to the transmitting UE. Otherwise, if the TX-RX distance is greater than the communication range requirement, the receiving UE may not transmit the HARQ feedback for the PSSCH to the transmitting UE. For example, the transmitting UE may inform the receiving UE of a location of the transmitting UE through SCI related to the PSSCH. For example, the SCI related to the PSSCH may be second SCI. For example, the receiving UE may estimate or obtain the TX-RX distance based on a location of the receiving UE and the location of the transmitting UE. For example, the receiving UE may decode the SCI related to the PSSCH and thus may know the communication range requirement used in the PSSCH.

For example, in case of the resource allocation mode 1, a time (offset) between the PSFCH and the PSSCH may be configured or pre-configured. In case of unicast and groupcast, if retransmission is necessary on SL, this may be indicated to a BS by an in-coverage UE which uses the PUCCH. The transmitting UE may transmit an indication to a serving BS of the transmitting UE in a form of scheduling request (SR)/buffer status report (BSR), not a form of HARQ ACK/NACK. In addition, even if the BS does not receive the indication, the BS may schedule an SL retransmission resource to the UE. For example, in case of the resource allocation mode 2, a time (offset) between the PSFCH and the PSSCH may be configured or pre-configured.

For example, from a perspective of UE transmission in a carrier, TDM between the PSCCH/PSSCH and the PSFCH may be allowed for a PSFCH format for SL in a slot. For example, a sequence-based PSFCH format having a single symbol may be supported. Herein, the single symbol may not an AGC duration. For example, the sequence-based PSFCH format may be applied to unicast and groupcast.

For example, in a slot related to a resource pool, a PSFCH resource may be configured periodically as N slot durations, or may be pre-configured. For example, N may be configured as one or more values greater than or equal to 1. For example, N may be 1, 2, or 4. For example, HARQ feedback for transmission in a specific resource pool may be transmitted only through a PSFCH on the specific resource pool.

For example, if the transmitting UE transmits the PSSCH to the receiving UE across a slot #X to a slot #N, the receiving UE may transmit HARQ feedback for the PSSCH to the transmitting UE in a slot #(N+A). For example, the slot #(N+A) may include a PSFCH resource. Herein, for example, A may be a smallest integer greater than or equal to K. For example, K may be the number of logical slots. In this case, K may be the number of slots in a resource pool. Alternatively, for example, K may be the number of physical slots. In this case, K may be the number of slots inside or outside the resource pool.

For example, if the receiving UE transmits HARQ feedback on a PSFCH resource in response to one PSSCH transmitted by the transmitting UE to the receiving UE, the receiving UE may determine a frequency domain and/or code domain of the PSFCH resource based on an implicit mechanism in a configured resource pool. For example, the receiving UE may determine the frequency domain and/or code domain of the PSFCH resource, based on at least one of a slot index related to PSCCH/PSSCH/PSFCH, a sub-channel related to PSCCH/PSSCH, and/or an identifier for identifying each receiving UE in a group for HARQ feedback based on the groupcast option 2. Additionally/alternatively, for example, the receiving UE may determine the frequency domain and/or code domain of the PSFCH resource, based on at least one of SL RSRP, SINR, L1 source ID, and/or location information.

For example, if HARQ feedback transmission through the PSFCH of the UE and HARQ feedback reception through the PSFCH overlap, the UE may select any one of HARQ feedback transmission through the PSFCH and HARQ feedback reception through the PSFCH based on a priority rule. For example, the priority rule may be based on at least priority indication of the related PSCCH/PSSCH.

For example, if HARQ feedback transmission of a UE through a PSFCH for a plurality of UEs overlaps, the UE may select specific HARQ feedback transmission based on the priority rule. For example, the priority rule may be based on at least priority indication of the related PSCCH/PSSCH.

Hereinafter, a sidelink control information (SCI) will be described.

Control information transmitted by a BS to a UE through a PDCCH may be referred to as downlink control information (DCI), whereas control information transmitted by the UE to another UE through a PSCCH may be referred to as SCI. For example, the UE may know in advance a start symbol of the PSCCH and/or the number of symbols of the PSCCH, before decoding the PSCCH. For example, the SCI may include SL scheduling information. For example, the UE may transmit at least one SCI to another UE to schedule the PSSCH. For example, one or more SCI formats may be defined.

For example, a transmitting UE may transmit the SCI to a receiving UE on the PSCCH. The receiving UE may decode one SCI to receive the PSSCH from the transmitting UE.

For example, the transmitting UE may transmit two consecutive SCIs (e.g., 2-stage SCI) to the receiving UE on the PSCCH and/or the PSSCH. The receiving UE may decode the two consecutive SCIs (e.g., 2-stage SCI) to receive the PSSCH from the transmitting UE. For example, if SCI configuration fields are divided into two groups in consideration of a (relatively) high SCI payload size, an SCI including a first SCI configuration field group may be referred to as a first SCI or a $1^{st}$ SCI, and an SCI including a second SCI configuration field group may be referred to as a second SCI or a $2^{nd}$ SCI. For example, the transmitting UE may transmit the first SCI to the receiving UE through the PSCCH. For example, the transmitting UE may transmit the second SCI to the receiving UE on the PSCCH and/or the PSSCH. For example, the second SCI may be transmitted to the receiving UE through an (independent) PSCCH, or may be transmitted in a piggyback manner together with data through the PSSCH. For example, two consecutive SCIs may also be applied to different transmissions (e.g., unicast, broadcast, or groupcast).

For example, the transmitting UE may transmit the entirety or part of information described below to the receiving UE through the SCI. Herein, for example, the transmitting UE may transmit the entirety or part of the information described below to the receiving UE through the first SCI and/or the second SCI.

PSSCH and/or PSCCH related resource allocation information, e.g., the number/positions of time/frequency resources, resource reservation information (e.g., period), and/or SL CSI report request indicator or SL (L1) RSRP (and/or SL (L1) RSRQ and/or SL (L1) RSSI) report request indicator, and/or SL CSI transmission indicator (or SL (L1) RSRP (and/or SL (L1) RSRQ and/or SL (L1) RSSI) information transmission indicator)) (on PSSCH), and/or MCS information, and/or Transmit power information, and/or L1 destination ID information and/or L1 source ID information, and/or SL HARQ process ID information, and/or New data indicator (NDI) information, and/or Redundancy version (RV) information, and/or (Transmission traffic/packet related) QoS information, e.g., priority information, and/or SL CSI-RS transmission indicator or information on the number of (to-be-transmitted) SL CSI-RS antenna ports, and/or Location information of a transmitting UE or location (or distance region) information of a target receiving UE (for which SL HARQ feedback is requested), and/or Reference signal (e.g., DMRS, etc.) related to channel estimation and/or decoding of data to be transmitted through a PSSCH, e.g., information related to a pattern of a (time-frequency) mapping resource of DMRS, rank information, antenna port index information For example, the first SCI may include information related to channel sensing. For example, the receiving UE may decode the second SCI by using a PSSCH DMRS. A polar code used in a PDCCH may be applied to the second SCI. For example, in a resource pool, a payload size of the first SCI may be identical for unicast, groupcast, and broadcast. After decoding the first SCI, the receiving UE does not have to perform blind decoding of the second SCI. For example, the first SCI may include scheduling information of the second SCI.

Meanwhile, in various embodiments of the present disclosure, since a transmitting UE may transmit at least one of a SCI, a first SCI, and/or a second SCI to a receiving UE through a PSCCH, the PSCCH may be replaced/substituted with at least one of the SCI, the first SCI and/or the second SCI. Additionally/alternatively, for example, the SCI may be replaced/substituted with at least one of the PSCCH, the first SCI, and/or the second SCI. Additionally/alternatively, for example, since a transmitting UE may transmit a second SCI to a receiving UE through a PSSCH, the PSSCH may be replaced/substituted with the second SCI.

In the present disclosure, the term "configuration/configured or definition/defined" may be interpreted as being (pre-)configured from the base station or the network (through predefined signaling (e.g., SIB, MAC signaling, RRC signaling)). For example, "A may be configured" may include "that the base station or the network (pre-)configures/defines or informs A to the UE". Alternatively, the term "configuration/configured or definition/defined" may be interpreted as being pre-configured or pre-defined in the system. For example, "A may be configured" may include "that A is pre-configured/defined in the system".

Meanwhile, in the next generation system, the UE may allow a SL channel/signal and a UL channel/signal in a single carrier or cell. For example, if a UL carrier is configured to be large, the UE may frequently not utilize all of the resources according to actual traffic. In this case, if simultaneous transmission of SL and UL is allowed even on a single carrier, the resource waste problem can be alleviated. Meanwhile, the UE may perform a power control method between SL and UL, assuming that SL and UL belong to different carriers or serving cells without considering the above situation. Accordingly, it may be necessary to newly add/define a power control method for a SL and/or UL channel/signal in the next generation system.

Meanwhile, it may be easy to implement for the UE to perform power control in the unit of a serving cell or in the unit of a carrier. In this case, it is necessary to newly define a power control method for a carrier in which SL and UL channels exist at the same time.

Meanwhile, if the total transmit power of the UE exceeds the maximum transmit power, the UE may determine a channel in which power is to be adjusted based on a priority value for a SL channel in the process of distributing power between UL and SL.

For example, the UE may select a carrier in which transmit power is to be reduced, based on a priority, among a carrier (group) through which only UL channels/signals are transmitted and a carrier through which UL and SL channels/signals are transmitted. For example, if the UE determines that a SL channel has a higher priority than UL on other carriers overlapping in time, the UE may maintain transmit power of SL and/or UL of a carrier through which the SL channel is transmitted, and the UE may reduce transmit power of UL transmitted in other carriers. For example, if the UE determines that a SL channel has a lower priority than UL on other carriers overlapping in time, the UE may reduce transmit power of SL and/or UL of s carrier through which the SL channel is transmitted, and the UE may maintain transmit power of UL transmitted in other carriers.

For example, the UE may ignore a priority of a SL channel with respect to a carrier through which SL and UL are simultaneously transmitted, and the UE may allocate power to each carrier by assuming that all carriers are UL carriers. After that, the UE may distribute power allocated for the carrier through which SL and UL are simultaneously transmitted to a SL channel and a UL channel again. For example, in the case of the carrier through which SL and UL are simultaneously transmitted, the UE may allocate power allocated for the carrier to a SL channel first, and then allocate the remaining power to a UL channel. For example, in the case of the carrier through which SL and UL are simultaneously transmitted, the UE may allocate power allocated for the carrier to a UL channel first, and then allocate the remaining power to a SL channel. For example, in the case of the carrier through which SL and UL are simultaneously transmitted, the UE may allocate the remaining power to channels of the remaining link after first allocating power allocated for the carrier to a channel having a higher priority according to a priority of a SL channel.

For example, the UE may determine a priority between SL and UL with respect to a carrier through which SL and UL are simultaneously transmitted. In this case, if the UE determines that a priority of a SL channel is high, the UE may determine a priority between a SL carrier and a UL carrier by assuming that the carrier is the SL carrier. Thereafter, after determining whether to reduce or maintain transmit power of the SL carrier, the UE may perform power allocation for the SL channel and the UL channel in the SL carrier. For example, if the UE determines that a priority of a SL channel is low with respect to a carrier through which SL and UL are simultaneously transmitted, the UE may allocate power between UL carriers by assuming that the carrier is the UL carrier. Thereafter, the UE may perform power allocation for the SL channel and the UL channel in the carrier.

For example, with respect to a carrier through which SL and UL are simultaneously transmitted, if a UL channel has a higher priority than UL channels of other carriers, the UE may maintain transmit power for the carrier through which SL and UL are simultaneously transmitted, and the UE may reduce UL transmit power of other carriers. For example, in the above case, the UE may preferentially allocate transmit power for the carrier through which SL and UL are simultaneously transmitted to the UL channel, and the UE may allocate the remaining power to a SL channel.

Meanwhile, in a carrier through which SL and UL are simultaneously transmitted, the UE may apply TA in the case of UL transmission, and may not apply TA in the case of SL transmission. Accordingly, the difference between a slot boundary and/or a symbol boundary for UL and a slot boundary and/or a symbol boundary for SL may be greater than or equal to a certain level. In the above case, the implementation of the UE may be complicated. For example, simultaneous transmission of SL and UL in a single carrier may be allowed only if the difference between the slot boundary and/or the symbol boundary for UL and the slot boundary and/or the symbol boundary for SL is less than or equal to the certain level (e.g., 32 usec or other fixed value, or a (pre)configured value). For example, in order to align the difference between the slot boundary and/or the symbol boundary for UL and the slot boundary and/or the symbol boundary for SL to the certain level or less, in simultaneous transmission of SL and UL in the single carrier, the UE may shift the symbol boundary of SL, and the UE may transmit an offset value for the shift to other UEs performing SL communication. For example, in order to align the difference between the slot boundary and/or the symbol boundary for UL and the slot boundary and/or the symbol boundary for SL to the certain level or less, in simultaneous transmission of SL and UL in the single carrier (i.e., if the difference between the slot boundary and/or the symbol boundary for UL and SL is greater than (or equal to) the certain level, the UE may shift the slot boundary and/or the symbol boundary of SL, and the UE may transmit a S-SSB based on the slot boundary and/or the symbol boundary shifted from a slot boundary and/or a symbol boundary determined based on a synchronization reference source. For example, if the difference between the slot boundary and/or the symbol boundary for UL and the slot boundary and/or the symbol boundary for SL is greater than or equal to the certain level, the UE may select one of the UL channel or the SL channel and transmit it. In this case, for example, the UE may transmit a channel with a high priority. For example, the UE may indicate/transmit information on whether to shift the slot boundary and/or the symbol boundary for SL from a reference point determined based on a synchronization source and/or information on a shift value, through a PSCCH and/or a PSSCH and/or a PSBCH. For example, information on whether to shift the slot boundary and/or the symbol boundary for SL from a reference point determined based on a synchronization source and/or information on a shift value may be indicated/transmitted to the UE through a DCI or a (pre)configured parameter.

Meanwhile, in the case of simultaneous transmission of SL and UL in a single carrier, a case in which only a partial overlap may occur rather than a case in which a SL channel and a UL channel completely overlap in time. Meanwhile, in the case of transmission of the UE in the single carrier, depending on a situation, such as a resource block (RB) configuration is changed, transmit power for a carrier is changed, or power spectral density (PSD) is changed, a transient period may occur in the period at the transmitting UE, and accordingly, distortion of a signal may partially occur. For example, if transmission of a SL channel is overlapped in time to be included in a UL channel in the same carrier, the UE may perform simultaneous transmission of SL and UL in the carrier. For example, if a DMRS exists before and after a transient period in a SL channel, respectively, the UE may perform simultaneous SL and UL transmission in the same carrier. This is because the DMRS may be separately required due to a phase change before and after the transient period, and channel estimation cannot be accurately performed if the DMRS is not separately provided. For example, in the above case, if simultaneous transmission for SL and UL in the same carrier cannot be performed, the UE may cancel transmission of all or (overlapping) portions of SL or UL. For example, in the selection between SL and UL, the UE may select transmission with a lower priority and cancel the transmission. For example, with respect to a channel for which transmission in some symbols is canceled, if the DMRS is included in the some symbols, the UE may cancel transmission of the entire channel. For example, if there is no DMRS in the remaining symbols for a channel for which transmission in some symbols is canceled, the UE may cancel transmission of the entire channel. For example, a channel in which the first time of transmission is earlier in time may be a channel with a higher priority among the SL channel and the UL channel.

In an embodiment of the present disclosure, if a priority value for a SL channel (selected according to a priority index of a UL channel) is less than a (pre)configured threshold, the SL channel may have a higher priority than the UL channel. On the other hand, if the priority value for the SL channel (selected according to the priority index of the UL channel) is greater than or equal to the (pre)configured threshold, the UL channel may have a higher priority than the SL channel. Herein, if the threshold of the UL channel corresponding to a priority index 1 is not configured, the UL channel may have a higher priority than the SL channel. For example, a UL channel with a specific type (e.g., a random access-related UL channel) may always have a higher priority than a SL channel. In an embodiment of the present disclosure, in a procedure for determining priorities between a plurality of SL channels and a plurality of UL channels, if at least one SL channel has a higher priority than all recognizable overlapping UL channels in consideration of processing time, the priority of the SL channel(s) may be high. On the other hand, if one UL channel has a higher priority than all recognizable overlapping SL channels in consideration of processing time, the priority of the UL channel(s) may be high.

Meanwhile, the UE may perform UL transmission to the base station, and a priority index for each UL channel/signal may correspond to 0 or 1. According to a value of the priority index, UL transmission may correspond to an enhanced mobile broadband (eMBB) service (if the priority index is 0), and UL transmission may correspond to an ultra reliable low latency communications (URLLC) service (if the priority index is 1). Meanwhile, the UE may perform SL transmission and/or reception to another UE, and depending on the SL operation mode, the UE may report SL HARQ-ACK information to the base station by using a PUCCH or a PUSCH. Meanwhile, a plurality of UL channels/signals of the UE may overlap in time. In this case, the UE may determine a set of PUCCHs that do not overlap in time by resolving the overlapping for PUCCHs corresponding to a smaller priority index (through dropping or multiplexing, etc.). In the present disclosure, for convenience of description, a channel that is not dropped or a channel that is not multiplexed to other channels in a procedure for resolving the overlapping may be referred to as a non-overlapped channel. If a PUSCH of the same priority index overlaps the set of non-overlapped PUCCHs entirely or partially, the UE may determine to transmit all or part of UCI corresponding to the set of non-overlapped PUCCHs through the PUSCH. Meanwhile, after that, the UE may apply the overlapping resolution method between the overlapped PUCCHs and/or PUSCHs to PUCCHs and/or PUSCHs of a larger priority index. Meanwhile, after that, the UE may determine whether to overlap with respect to a set of non-overlapped PUCCHs and/or PUSCHs determined for each priority index. In this case, a PUCCH and/or a PUSCH of a larger priority index may have higher priority than a PUCCH and/or a PUSCH of a smaller priority index. For example, in the above situation, the UE may cancel transmission for a PUCCH and/or a PUSCH of a smaller priority index overlapping a PUCCH and/or a PUSCH of a larger priority index. For example, the above situation may be determined differently depending on a processing time. In an embodiment of the present disclosure, for convenience of description, a PUCCH and a PUSCH of a smaller priority index (e.g., a value of 0) may be referred to as eMBB PUCCH and eMBB PUSCH. A PUCCH and a PUSCH of a larger priority index (e.g., a value of 1) may be referred to as URLLC PUCCH and URLLC PUSCH.

Meanwhile, when a PUCCH for a SL HARQ-ACK report (hereinafter, SL PUCCH) and the eMBB PUCCH and/or the eMBB PUSCH and/or the URLLC PUCCH and/or the URLLC PUSCH overlap in time, it is necessary to define the operation of the UE. For example, if at least one of the SL PUCCH, the eMBB PUCCH, the eMBB PUSCH, the URLLC PUCCH, and/or the URLLC PUSCH partially or entirely overlaps in a time domain, the UE needs to determine a channel to transmit from among the channels. Based on various embodiments of the present disclosure, if at least one of the SL PUCCH, the eMBB PUCCH, the eMBB PUSCH, the URLLC PUCCH, and/or the URLLC PUSCH partially or entirely overlaps in a time domain, a method for a UE to prioritize the channels and an apparatus supporting the same are proposed.

For example, the UE may perform a procedure for resolving the overlapping problem for the eMBB PUCCH and/or the eMBB PUSCH and/or the URLLC PUCCH and/or the URLLC PUSCH in time. For example, the UE may determine whether the SL PUCCH overlaps with the non-overlapped eMBB PUCCH and/or the non-overlapped eMBB PUSCH and/or the non-overlapped URLLC PUCCH and/or the non-overlapped URLLC PUSCH determined after performing the procedure for resolving the overlapping in time. Meanwhile, if the SL PUCCH and the URLLC PUSCH overlap, the UE may cancel transmission of the SL PUCCH, and a SL HARQ-ACK report may not be included in the URLLC PUSCH. For example, in the non-overlapping situation between the Uu channels, the UE may first check whether the SL PUCCH and the eMBB PUSCH overlap, and the UE may next check whether the SL PUCCH and the URLLC PUSCH overlap. Through this, if the SL PUCCH overlaps the eMBB PUSCH and the URLLC PUSCH, and if the PUSCHs do not overlap each other, the UE may first include SL HARQ-ACK in the eMBB PUSCH, and then may cancel transmission of the SL PUCCH. Accordingly, it is possible to prevent unnecessary drop of SL HARQ-ACK information.

For example, for the non-overlapped set, if the SL PUCCH overlaps with the URLLC PUSCH and/or the eMBB PUSCH including no Uu UCI, the UE may transmit a SL HARQ-ACK report transmitted through the SL PUCCH by including it in the eMBB PUSCH and/or the URLLC PUSCH, and the UE may cancel transmission of the SL PUCCH. For example, in the case of the non-overlapped set, if the SL PUCCH overlaps with the eMBB PUSCH including no Uu UCI, the UE may transmit a SL HARQ-ACK report transmitted through the SL PUCCH by including it in the eMBB PUSCH, and the UE may cancel transmission of the SL PUCCH. For example, in the above case, if the SL PUCCH and a plurality of PUSCHs overlap, the UE may include the SL HARQ-ACK report in the early PUSCH in time. For example, in the above case, if the SL PUCCH and a plurality of PUSCHs overlap, the UE may include the SL HARQ-ACK report in the URLLC PUSCH. For example, in the above case, if the SL PUCCH and a plurality of PUSCHs overlap, the UE may include the SL HARQ-ACK report in the eMBB PUSCH. For example, based on the combination, the UE may determine a PUSCH including the SL HARQ-ACK report.

For example, for the non-overlapped set, if the SL PUCCH overlaps with the URLLC PUSCH and/or the eMBB PUSCH including Uu UCI in time, the UE may determine whether to prioritize the SL PUCCH or the Uu UCI included in the PUSCH or the PUSCH according to a prioritization method between SL and UL (e.g., if a priority value for the SL is less than a threshold corresponding to URLLC or eMBB, the SL is prioritized, otherwise the UL is prioritized). For example, in the above case, if the UE determines that the SL PUCCH is prioritized over the eMBB PUSCH and/or the URLLC PUSCH, the UE may cancel mapping the Uu UCI included in the PUSCH, and the UE may include SL HARQ-ACK information in the PUSCH, and the UE may cancel transmission of the SL PUCCH. For example, in the above case, if the SL PUCCH and a plurality of PUSCHs overlap, the UE may include the SL HARQ-ACK report in the early PUSCH in time. For example, in the above case, if the SL PUCCH and a plurality of PUSCHs overlap, the UE may include the SL HARQ-ACK report in the URLLC PUSCH. For example, in the above case, if the SL PUCCH and a plurality of PUSCHs overlap, the UE may include the SL HARQ-ACK report in the eMBB PUSCH. For example, based on the combination, the UE may determine a PUSCH including the SL HARQ-ACK report.

For example, for the non-overlapped set, if the SL PUCCH overlaps with the eMBB PUCCH and/or the URLLC PUCCH in time, the UE may determine a PUCCH to be transmitted and a PUCCH to be canceled according to a prioritization method between SL and UL. For example, for the non-overlapped set, the UE may compare the SL PUCCH and the overlapped URLLC PUCCH. In this case, if the SL PUCCH has a lower priority than the URLLC PUCCH, the UE may determine a PUCCH to be transmitted or to be canceled by comparing the SL PUCCH and the eMBB PUCCH.

For example, for the non-overlapped set, the UE may perform priority determination for channels overlapping with the SL PUCCH in the early order in time. For example, for the non-overlapped set, the UE may perform priority determination for channels overlapping with the SL PUCCH in the order determined according to a type of the channel and/or whether Uu UCI is included and/or whether UL-SCH is included, etc. (e.g., in the order of the above embodiment).

For example, in the above case, if the UE determines that the SL PUCCH is not prioritized over the overlapped eMBB PUCCH and/or the overlapped URLLC PUCCH and/or the overlapped eMBB PUSCH with Uu UCI and/or the overlapped URLLC PUSCH with Uu UCI, the UE may cancel transmission of the SL PUCCH.

For example, the UE may also consider the SL PUCCH overlapped with the eMBB PUCCH and/or the eMBB PUSCH when performing a procedure for resolving the overlapping problem for the eMBB PUCCH and/or the eMBB PUSCH in time. For example, if the UE determines the overlapping for the eMBB PUCCH and the SL PUCCH including the SL HARQ-ACK report, the UE may resolve the overlapping for the eMBB PUCCH and the SL PUCCH including the SL HARQ-ACK report. For example, for the eMBB PUSCH including no UL-SCH and/or the eMBB PUCCH overlapped with the SL PUCCH in time, the UE may determine a UL channel to be transmitted and a UL channel to be canceled according to a prioritization method between SL and UL. For example, if the eMBB PUCCH and the SL PUCCH including the SL HARQ-ACK report overlap, the UE may determine a UL channel to be transmitted and a UL channel to be canceled according to a prioritization method between SL and UL. For example, if the SL PUCCH and the eMBB PUSCH overlap after the above procedure, the UE may include SL HARQ-ACK information in the PUSCH. For example, if Uu UCI is already included in the eMBB PUSCH, the UE may cancel mapping the Uu UCI when SL is prioritized according to a prioritization method between SL and UL, and the UE may include SL HARQ-ACK information in the PUSCH. For example, the PUSCH may include UL-SCH. For example, if the PUSCH includes no UL-SCH, the UE may omit transmission of the PUSCH when the SL is prioritized according to a prioritization method between SL and UL. For example, in the above case, if there are a plurality of eMBB PUSCHs overlapping with the SL PUCCH, the UE may preferentially include SL HARQ-ACK information in a PUSCH that does not include Uu UCI. For example, in this case, if the SL PUCCH overlaps only the eMBB PUSCH including Uu UCI, the UE may omit transmission of the PUSCH when SL is prioritized according to a prioritization method between SL and UL.

For example, the UE may also consider the SL PUCCH in the same manner as above when performing a procedure for resolving the overlapping problem for the URLLC PUCCH and/or the URLLC PUSCH in time. For example, if the UE determines the overlapping for the URLLC PUCCH and the SL PUCCH including the SL HARQ-ACK report, the UE may resolve the overlapping for the URLLC PUCCH and the SL PUCCH including the SL HARQ-ACK report.

In the above case, SL HARQ-ACK information may be transmitted in duplicate in the URLLC PUSCH and the eMBB PUSCH. Or, for example, in the above case, the UE may include SL HARQ-ACK information only in the eMBB PUSCH or the URLLC PUSCH. For example, in the above case, the UE may include SL HARQ-ACK information only in the earlier or later PUSCH in time. For example, in the above case, the UE may cancel mapping SL HARQ-ACK information to the eMBB PUSCH. For example, in the above case, the UE may cancel mapping SL HARQ-ACK information to the URLLC PUSCH. Based on an embodiment of the present disclosure, the above method may be extended and applied even when the eMBB PUSCH or the URLLC PUSCH including SL HARQ-ACK information is transmitted in the same slot as the SL PUCCH and does not overlap in time. For example, in the above case, the UE may cancel SL PUCCH transmission. For example, in the above case, the UE may cancel the mapping of SL HARQ-ACK information mapped to the PUSCH.

Meanwhile, if SL HARQ-ACK information is mapped to the eMBB PUSCH in a procedure for resolving the overlapping between the SL PUCCH and the eMBB PUCCH and/or PUSCH, and if the SL PUCCH remains in a procedure for resolving the overlapping between the SL PUCCH and the URLLC PUCCH and/or PUSCH, the eMBB PUSCH and the SL PUCCH may overlap each other in time again. For example, if the eMBB PUSCH including SL HARQ-ACK information and the SL PUCCH overlap in time, the UE may cancel transmission of the SL PUCCH. This is because the same information has already been included in the eMBB PUSCH. Or, for example, if the eMBB PUSCH including SL HARQ-ACK information and the SL PUCCH overlap in time, the UE may cancel transmission of the eMBB PUSCH. This is because it may be determined that the coverage of the SL PUCCH is greater than the eMBB PUSCH. More specifically, for example, if SL HARQ-ACK information mapped to the eMBB PUSCH and SL HARQ-ACK information transmitted through the SL PUCCH are different, the UE may 1) additionally map SL HARQ-ACK information transmitted through the SL PUCCH to the eMBB PUSCH, or 2) cancel transmission of a UL channel with a lower priority by directly comparing a priority of SL HARQ-ACK information mapped to the PUSCH with a priority of SL HARQ-ACK information included in the SL PUCCH.

Meanwhile, if the SL PUCCH remains in a procedure for resolving the overlapping between the SL PUCCH and the eMBB PUCCH and/or PUSCH, and if SL HARQ-ACK information is mapped to the URLLC PUSCH in a procedure for resolving the overlapping between the SL PUCCH and the URLLC PUCCH and/or PUSCH, the URLLC PUSCH and the SL PUCCH may overlap each other in time again. For example, if the URLLC PUSCH including SL HARQ-ACK information and the SL PUCCH overlap in time, the UE may cancel transmission of the SL PUCCH. This is because the same information has already been included in the URLLC PUSCH. Or, for example, if the URLLC PUSCH including SL HARQ-ACK information and the SL PUCCH overlap in time, the UE may cancel transmission of the PUSCH. This is because it may be determined that the coverage of the SL PUCCH is greater than the URLLC PUSCH. More specifically, for example, if SL HARQ-ACK information mapped to the URLLC PUSCH and SL HARQ-ACK information transmitted through the SL PUCCH are different, the UE may 1) additionally map SL HARQ-ACK information transmitted through the SL PUCCH to the URLLC PUSCH, or 2) cancel transmission of a UL channel with a lower priority by directly comparing a priority of SL HARQ-ACK information mapped to the PUSCH with a priority of SL HARQ-ACK information included in the SL PUCCH.

Figure 10:
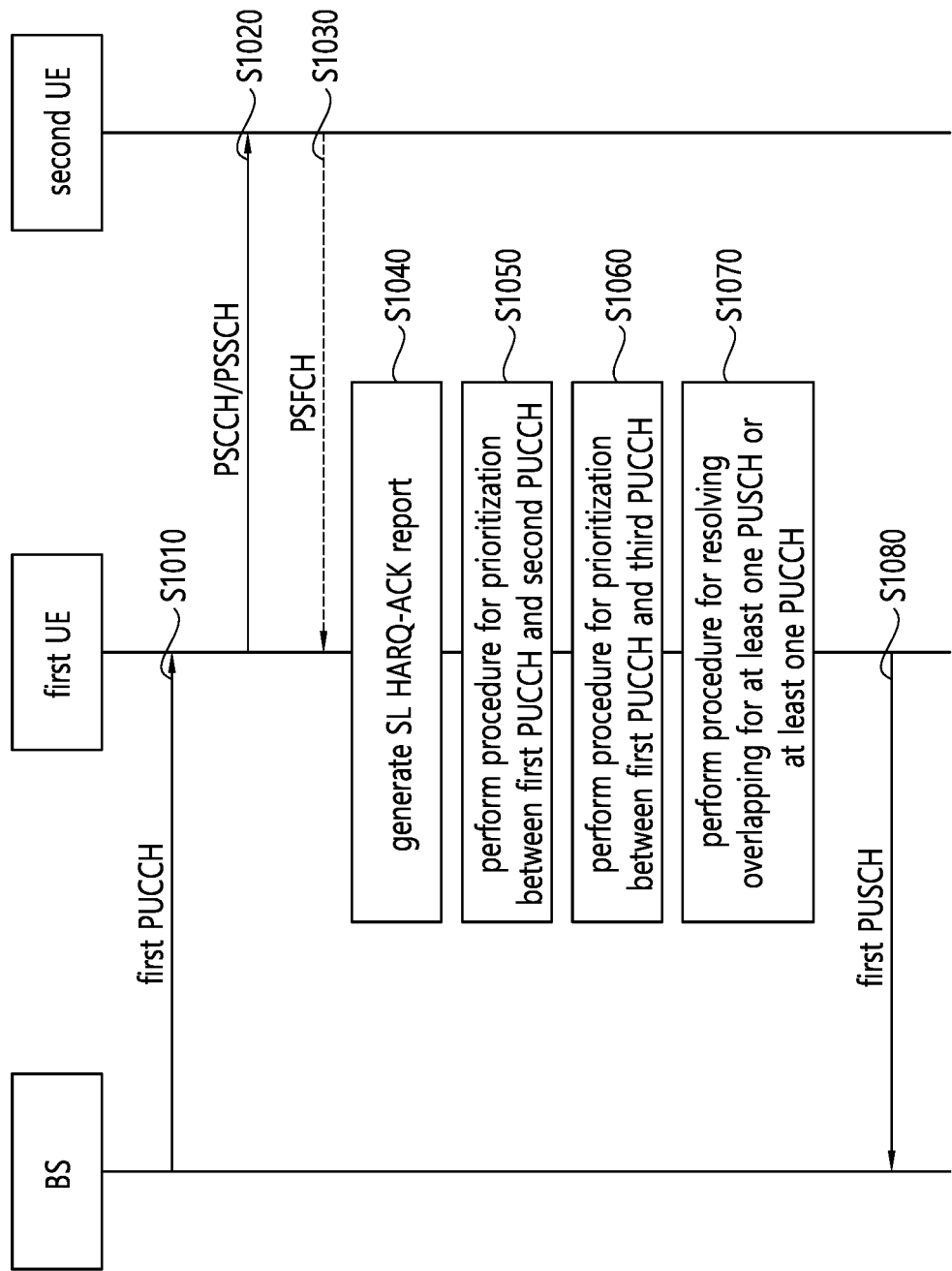
FIG. 10 shows a procedure for a UE to prioritize UL transmission, based on an embodiment of the present disclosure.

FIG. 10 shows a procedure for a UE to prioritize UL transmission, based on an embodiment of the present disclosure. The embodiment of FIG. 10 may be combined with various embodiments of the present disclosure.

Referring to FIG. 10, in step S1010, a first UE may receive information related to a first PUCCH for a SL HARQ-ACK report from a base station. Additionally, the first UE may receive information related to a SL resource from the base station.

In step S1020, the first UE may transmit a PSCCH and/or a PSSCH to a second UE. For example, the first UE may transmit a first SCI for scheduling of the PSSCH and a second SCI to the second UE through the PSCCH. For example, the first UE may transmit the second SCI and data (e.g., MAC PDU) to the second UE through the PSSCH.

In step S1030, the first UE may receive a PSFCH from the second UE. For example, the first UE may receive SL HARQ-ACK from the second UE through the PSFCH. For example, the SL HARQ-ACK may be ACK information or NACK information.

In step S1040, the first UE may generate a SL HARQ-ACK report. For example, if the first UE receives ACK information through the PSFCH, the first UE may generate the SL HARQ-ACK report as ACK information. For example, if the first UE receives NACK information through the PSFCH, the first UE may generate the SL HARQ-ACK report as NACK information. For example, if the first terminal fails to detect the PSFCH in the groupcast option 1 (i.e., NACK only feedback), the first UE may generate the SL HARQ-ACK report as ACK information. For example, if the first UE fails to detect the PSFCH in the groupcast option 2 or unicast (i.e., ACK/NACK feedback), the first UE may generate the SL HARQ-ACK report as NACK information.

In step S1050, based on the overlapping for the first PUCCH and a second PUCCH of a smaller priority index, the first UE may perform a procedure for prioritization between the first PUCCH and the second PUCCH. In step S1060, based on the overlapping for the first PUCCH and a third PUCCH of a larger priority index, the first UE may perform a procedure for prioritization between the first PUCCH and the third PUCCH. In other words, in steps S1050 and S1060, if the first UE determines the overlapping for PUCCH transmission including the SL HARQ-ACK report and a PUCCH of a larger priority index and/or a smaller priority index, the first UE may resolve the overlapping for the PUCCH transmission including the SL HARQ-ACK report and the PUCCH of each priority index. For example, if the first UE determines the overlapping for PUCCH transmission including the SL HARQ-ACK report and a PUCCH of a larger priority index and/or a smaller priority index, the first UE may resolve the overlapping for the PUCCH transmission including the SL HARQ-ACK report and the PUCCH of each priority index before resolving the overlapping for PUCCH transmission including no SL HARQ-ACK or the overlapping for PUCCH transmission and PUSCH transmission. In the embodiment of FIG. 10, it is assumed that the first UE prioritizes the first PUCCH over the second PUCCH in step S1050 and prioritizes the first PUCCH over the third PUCCH in step S1060.

In step S1070, the first UE may perform a procedure for resolving the overlapping for at least one PUSCH or at least one PUCCH including no SL HARQ-ACK report. Herein, for example, the first UE may select a first PUSCH. For example, the first PUSCH may be a PUSCH of a larger priority index. For example, the first PUSCH may be a PUSCH of a smaller priority index. For example, after resolving the overlapping for the at least one PUSCH or the at least one PUCCH including no SL HARQ-ACK report, the first UE may determine the overlapping for the first PUCCH and the first PUSCH.

In step S1080, the first UE may transmit the first PUSCH to the base station.

For example, after resolving the overlapping for PUSCH transmission and/or PUCCH other than PUCCH transmission including the SL HARQ-ACK report, if the first UE determines the overlapping for PUCCH transmission including the SL HARQ-ACK report and a PUSCH of a smaller priority index, the first UE may resolve the overlapping for the PUCCH transmission including the SL HARQ-ACK report and the PUSCH of the smaller priority index, if the PUSCH includes no UCI. In this case, the first UE may transmit the SL HARQ-ACK report by multiplexing it to the first PUSCH.

For example, after resolving the overlapping for PUSCH transmission and/or PUCCH other than PUCCH transmission including the SL HARQ-ACK report, if the first UE determines the overlapping for PUCCH transmission including the SL HARQ-ACK report and a PUSCH of a larger priority index, the first UE may not transmit the PUCCH including the SL HARQ-ACK report.

For example, the base station may indicate whether SL HARQ-ACK information may be included in a PUSCH. For example, a sidelink assignment index (SAI) field may be included in a PUSCH scheduled by a DCI, and the UE may determine whether SL HARQ-ACK information may be included in the PUSCH according to a value of the SAI field. For example, if the value of the SAI field of the DCI indicates that SL HARQ-ACK information is not included in the PUSCH (a value of 0 in the case of a semi-static codebook, a value of 4 or 0 in the case of a dynamic codebook), and if the PUSCH and the PUCCH including the SL HARQ-ACK information overlap in time, the UE may transmit the PUSCH, and the UE may cancel transmission of the PUCCH including the SL HARQ-ACK information. For example, the PUSCH may be limited to a case in which the priority index value is 1. For example, if the value of the SAI field of the DCI for scheduling the PUSCH indicates that the PUSCH includes SL HARQ-ACK information, and if there is no PUCCH including SL HARQ-ACK information overlapping with the PUSCH (e.g., transmission is canceled in the previous step), the UE may set all values to NACK. For example, if the value of the SAI field of the DCI for scheduling the PUSCH indicates that the PUSCH includes SL HARQ-ACK information, and if there is no PUCCH including SL HARQ-ACK information overlapping with the PUSCH (e.g., transmission is canceled in the previous step), the UE may set all values to ACK. For example, if the value of the SAI field of the DCI for scheduling the PUSCH indicates that the PUSCH includes SL HARQ-ACK information, and if there is no PUCCH including SL HARQ-ACK information overlapping with the PUSCH (e.g., transmission is canceled in the previous step), a codebook value may be set as a combination of predefined values. For example, if the value of the SAI field of the DCI for scheduling the PUSCH indicates that the PUSCH includes SL HARQ-ACK information, and if there is no PUCCH including SL HARQ-ACK information overlapping with the PUSCH (e.g., transmission is canceled in the previous step), a codebook value may be set by using SL HARQ-ACK information scheduled to be transmitted through the PUCCH in which transmission has been canceled. For example, the embodiment of the codebook setting can also be applied to a UL downlink assignment index (DAI) value setting of DCI and DL HARQ-ACK information according to this and/or Uu UCI. For example, if the DAI field value of the DCI for scheduling the PUSCH indicates that the PUSCH includes DL HARQ-ACK information, the UE may map Uu UCI information and/or DL HARQ-ACK information included in the Uu PUCCH to the PUSCH, regardless of whether transmission of the Uu PUCCH overlapping the PUSCH is canceled or not. For example, if the SL PUCCH (PUCCH including SL HARQ-ACK information) overlaps only with a PUSCH scheduled by a DCI indicating that SL HARQ-ACK information is not included through a SAI field value (if it does not overlap with a PUSCH scheduled by a DCI indicating that SL HARQ-ACK information is included through SAI), the UE may cancel transmission of the SL PUCCH in advance before resolving the overlapping between PUCCHs.

For example, in the case of a PUSCH scheduled by a DCI including SAI and DAI fields, the SAI value may be set assuming that SL HARQ-ACK information is included, regardless of the presence or absence of SL HARQ-ACK information and/or DL HARQ-ACK information and/or Uu UCI finally included in the PUSCH. For example, in the case of a PUSCH scheduled by a DCI including SAI and DAI fields, the DAI value may be set assuming that DL HARQ-ACK information is included, regardless of the presence or absence of SL HARQ-ACK information and/or DL HARQ-ACK information and/or Uu UCI finally included in the PUSCH.

For example, in the case of a PUSCH not scheduled by a DCI, if the PUSCH and a PUCCH including SL HARQ-ACK information overlap in time, the UE may transmit the PUSCH, and the UE may cancel transmission of the PUCCH including the SL HARQ-ACK information. For example, the PUSCH may be limited to a case in which the priority index value is 1. For example, in the case of a PUSCH scheduled by a DCI without a SAI field, if the PUSCH and a PUCCH including SL HARQ-ACK information overlap in time, the UE may transmit the PUSCH, and the UE may cancel transmission of the PUCCH including the SL HARQ-ACK information. For example, the PUSCH may be limited to a case in which the priority index value is 1.

For example, in the case of a DCI scheduling a PUSCH with a priority index value 1, a SAI value may always indicate 0 (in the case of semi-static codebook size, type 1 codebook), and the SAI value may always indicate 0 or 4 (in the case of dynamic codebook size and type 2 codebook).

Meanwhile, a PUSCH with a priority index value 9 may include SL HARQ-ACK information, DL HARQ-ACK information, or neither. In this case, when the base station sets a DAI value and/or a SAI value for scheduling the PUSCH transmission, the base station sets a value according to implementation regardless of a type of HARQ-ACK information included in the PUSCH, or the base station may set a value by counting the number of received DCIs corresponding to SL HARQ-ACK and/or the number of received DCIs corresponding to DL HARQ-ACK. Meanwhile, the base station may not recognize whether SL HARQ-ACK information has a higher priority than DL HARQ-ACK information or not. Accordingly, the base station may perform blind decoding (BD) for a UCI combination (SL HARQ-ACK information or Uu UCI) that can be included. Meanwhile, if a codebook size for DL HARQ-ACK information and a codebook size for SL HARQ-ACK information are the same, the base station may not be able to distinguish whether the received HARQ-ACK information is SL HARQ-ACK information or DL HARQ-ACK information. Accordingly, the base station may not be able to properly transmit a retransmission DCI to the UE. For example, the base station may not expect that DL HARQ-ACK information and SL HARQ-ACK information that can be transmitted through a PUSCH at the same time have the same codebook size. For example, if DL HARQ-ACK information and SL HARQ-ACK information have the same codebook size, the size may be changed differently by padding 0 or 1 bit to the SL HARQ-ACK codebook. For example, if DL HARQ-ACK information and SL HARQ-ACK information have the same codebook size, a specific masking sequence is applied to CRC for the SL HARQ-ACK information to make it possible to distinguish between DL and SL.

Based on various embodiments of the present disclosure, if at least one of the SL PUCCH, the eMBB PUCCH, the eMBB PUSCH, the URLLC PUCCH and/or the URLLC PUSCH partially or entirely overlaps in the time domain, the UE can clearly determine a channel to be transmitted. Through this, in a situation in which all or part of the eMBB UL, the URLLC UL, and/or the SL HARQ-ACK report overlap in time, the UE can efficiently perform prioritization of the SL HARQ-ACK report.

Figure 11:
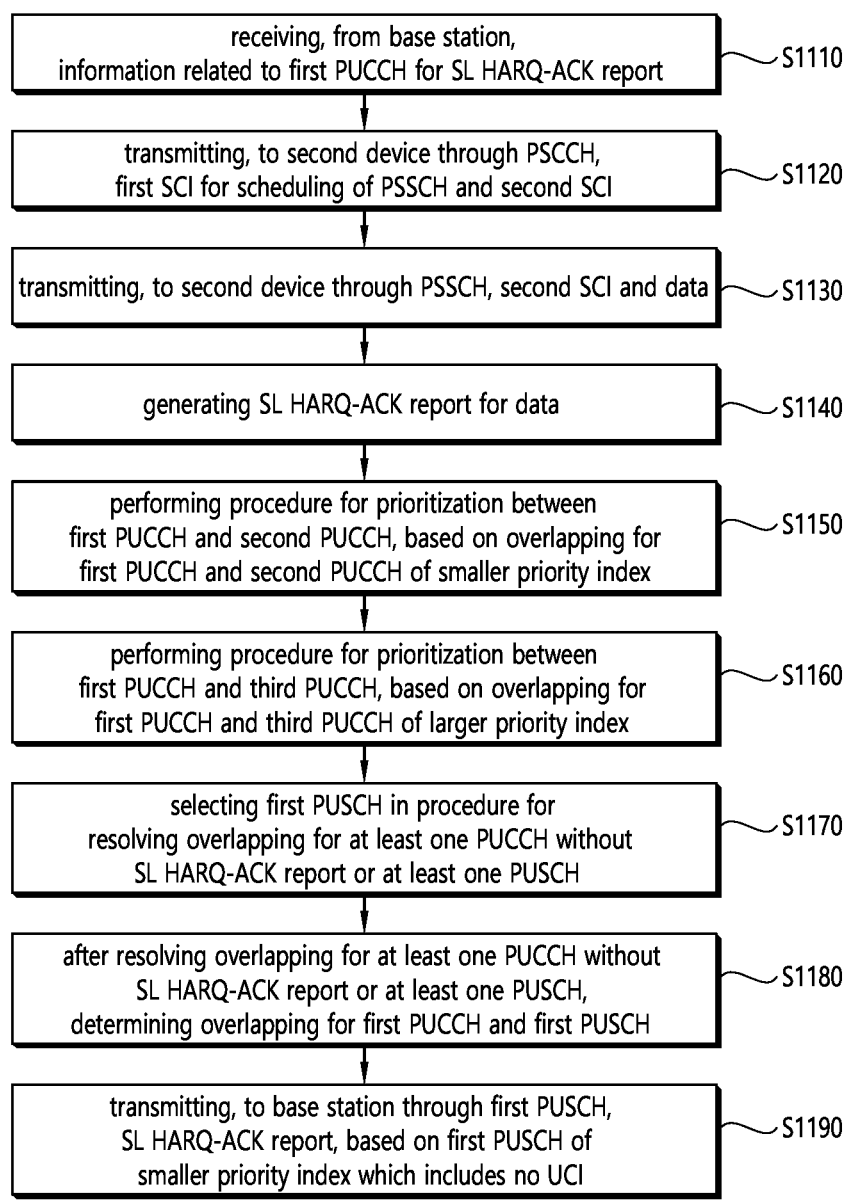
FIG. 11 shows a method for a first device to perform wireless communication, based on an embodiment of the present disclosure.

FIG. 11 shows a method for a first device to perform wireless communication, based on an embodiment of the present disclosure. The embodiment of FIG. 11 may be combined with various embodiments of the present disclosure.

Referring to FIG. 11, in step S1110, the first device may receive, from a base station, information related to a first physical uplink control channel (PUCCH) for a sidelink (SL) hybrid automatic repeat request (HARQ)-acknowledgment (ACK) report. In step S1120, the first device may transmit, to a second device through a physical sidelink control channel (PSCCH), a first sidelink control channel (SCI) for scheduling of a physical sidelink shared channel (PSSCH) and a second SCI. In step S1130, the first device may transmit, to the second device through the PSSCH, the second SCI and data. In step S1140, the first device may generate the SL HARQ-ACK report for the data. In step S1150, the first device may perform a procedure for prioritization between the first PUCCH and a second PUCCH, based on overlapping for the first PUCCH and the second PUCCH of a smaller priority index. In step S1160, the first device may perform a procedure for prioritization between the first PUCCH and a third PUCCH, based on overlapping for the first PUCCH and the third PUCCH of a larger priority index. In step S1170, the first device may select a first PUSCH in a procedure for resolving overlapping for at least one PUCCH without a SL HARQ-ACK report or at least one physical uplink shared channel (PUSCH). In step S1180, after resolving the overlapping for the at least one PUCCH without the SL HARQ-ACK report or the at least one PUSCH, the first device may determine overlapping for the first PUCCH and the first PUSCH. In step S1190, the first device may transmit, to the base station through the first PUSCH, the SL HARQ-ACK report, based on the first PUSCH of the smaller priority index which includes no uplink control information (UCI).

For example, the SL HARQ-ACK report may be multiplexed in the first PUSCH, based on the first PUSCH of the smaller priority index which includes no UCI.

For example, the first device may not transmit the first PUCCH including the SL HARQ-ACK report based on the first PUSCH of the larger priority index. Additionally, for example, the first device may transmit the first PUSCH to the base station, based on the first PUSCH of the larger priority index.

For example, the first PUCCH may be prioritized by the first device over the second PUCCH in the procedure for prioritization between the first PUCCH and the second PUCCH.

For example, the first PUCCH may be prioritized by the first device over the third PUCCH in the procedure for prioritization between the first PUCCH and the third PUCCH.

For example, the second PUCCH and the third PUCCH may be partially or entirely overlapped with the first PUCCH in a time domain.

For example, the procedure for prioritization between the first PUCCH and the second PUCCH may be performed by the first device before resolving the overlapping for the at least one PUCCH without the SL HARQ-ACK report and the least one PUSCH.

For example, the procedure for prioritization between the first PUCCH and the third PUCCH may be performed by the first device before resolving the overlapping for the at least one PUCCH without the SL HARQ-ACK report and the least one PUSCH.

For example, the smaller priority index may be 0.

For example, the larger priority index may be 1.

For example, the smaller priority index may be related to enhanced mobile broadband (eMBB).

For example, the larger priority index may be related to ultra reliable low latency communications (URLLC).

The proposed method can be applied to the device(s) based on various embodiments of the present disclosure. First, the processor 102 of the first device 100 may control the transceiver 106 to receive, from a base station, information related to a first physical uplink control channel (PUCCH) for a sidelink (SL) hybrid automatic repeat request (HARQ)-acknowledgment (ACK) report. In addition, the processor 102 of the first device 100 may control the transceiver 106 to transmit, to a second device through a physical sidelink control channel (PSCCH), a first sidelink control channel (SCI) for scheduling of a physical sidelink shared channel (PSSCH) and a second SCI. In addition, the processor 102 of the first device 100 may control the transceiver 106 to transmit, to the second device through the PSSCH, the second SCI and data. In addition, the processor 102 of the first device 100 may generate the SL HARQ-ACK report for the data. In addition, the processor 102 of the first device 100 may perform a procedure for prioritization between the first PUCCH and a second PUCCH, based on overlapping for the first PUCCH and the second PUCCH of a smaller priority index. In addition, the processor 102 of the first device 100 may perform a procedure for prioritization between the first PUCCH and a third PUCCH, based on overlapping for the first PUCCH and the third PUCCH of a larger priority index. In addition, the processor 102 of the first device 100 may select a first PUSCH in a procedure for resolving overlapping for at least one PUCCH without a SL HARQ-ACK report or at least one physical uplink shared channel (PUSCH). In addition, after resolving the overlapping for the at least one PUCCH without the SL HARQ-ACK report or the at least one PUSCH, the processor 102 of the first device 100 may determine overlapping for the first PUCCH and the first PUSCH. In addition, the processor 102 of the first device 100 may control the transceiver 106 to transmit, to the base station through the first PUSCH, the SL HARQ-ACK report, based on the first PUSCH of the smaller priority index which includes no uplink control information (UCI).

Based on an embodiment of the present disclosure, a first device configured to perform wireless communication may be provided. For example, the first device may comprise: one or more memories storing instructions; one or more transceivers; and one or more processors connected to the one or more memories and the one or more transceivers. For example, the one or more processors may execute the instructions to: receive, from a base station, information related to a first physical uplink control channel (PUCCH) for a sidelink (SL) hybrid automatic repeat request (HARQ)-acknowledgment (ACK) report; transmit, to a second device through a physical sidelink control channel (PSCCH), a first sidelink control channel (SCI) for scheduling of a physical sidelink shared channel (PSSCH) and a second SCI; transmit, to the second device through the PSSCH, the second SCI and data; generate the SL HARQ-ACK report for the data; perform a procedure for prioritization between the first PUCCH and a second PUCCH, based on overlapping for the first PUCCH and the second PUCCH of a smaller priority index; perform a procedure for prioritization between the first PUCCH and a third PUCCH, based on overlapping for the first PUCCH and the third PUCCH of a larger priority index; select a first PUSCH in a procedure for resolving overlapping for at least one PUCCH without a SL HARQ-ACK report or at least one physical uplink shared channel (PUSCH); after resolving the overlapping for the at least one PUCCH without the SL HARQ-ACK report or the at least one PUSCH, determine overlapping for the first PUCCH and the first PUSCH; and transmit, to the base station through the first PUSCH, the SL HARQ-ACK report, based on the first PUSCH of the smaller priority index which includes no uplink control information (UCI).

Based on an embodiment of the present disclosure, an apparatus configured to control a first user equipment (UE) performing wireless communication may be provided. For example, the apparatus may comprise: one or more processors; and one or more memories operably connected to the one or more processors and storing instructions. For example, the one or more processors may execute the instructions to: receive, from a base station, information related to a first physical uplink control channel (PUCCH) for a sidelink (SL) hybrid automatic repeat request (HARQ)-acknowledgment (ACK) report; transmit, to a second UE through a physical sidelink control channel (PSCCH), a first sidelink control channel (SCI) for scheduling of a physical sidelink shared channel (PSSCH) and a second SCI; transmit, to the second UE through the PSSCH, the second SCI and data; generate the SL HARQ-ACK report for the data; perform a procedure for prioritization between the first PUCCH and a second PUCCH, based on overlapping for the first PUCCH and the second PUCCH of a smaller priority index; perform a procedure for prioritization between the first PUCCH and a third PUCCH, based on overlapping for the first PUCCH and the third PUCCH of a larger priority index; select a first PUSCH in a procedure for resolving overlapping for at least one PUCCH without a SL HARQ-ACK report or at least one physical uplink shared channel (PUSCH); after resolving the overlapping for the at least one PUCCH without the SL HARQ-ACK report or the at least one PUSCH, determine overlapping for the first PUCCH and the first PUSCH; and transmit, to the base station through the first PUSCH, the SL HARQ-ACK report, based on the first PUSCH of the smaller priority index which includes no uplink control information (UCI).

Based on an embodiment of the present disclosure, a non-transitory computer-readable storage medium storing instructions may be provided. For example, the non-transitory computer-readable storage medium storing instructions, when executed, may cause a first device to: receive, from a base station, information related to a first physical uplink control channel (PUCCH) for a sidelink (SL) hybrid automatic repeat request (HARQ)-acknowledgment (ACK) report; transmit, to a second device through a physical sidelink control channel (PSCCH), a first sidelink control channel (SCI) for scheduling of a physical sidelink shared channel (PSSCH) and a second SCI; transmit, to the second device through the PSSCH, the second SCI and data; generate the SL HARQ-ACK report for the data; perform a procedure for prioritization between the first PUCCH and a second PUCCH, based on overlapping for the first PUCCH and the second PUCCH of a smaller priority index; perform a procedure for prioritization between the first PUCCH and a third PUCCH, based on overlapping for the first PUCCH and the third PUCCH of a larger priority index; select a first PUSCH in a procedure for resolving overlapping for at least one PUCCH without a SL HARQ-ACK report or at least one physical uplink shared channel (PUSCH); after resolving the overlapping for the at least one PUCCH without the SL HARQ-ACK report or the at least one PUSCH, determine overlapping for the first PUCCH and the first PUSCH; and transmit, to the base station through the first PUSCH, the SL HARQ-ACK report, based on the first PUSCH of the smaller priority index which includes no uplink control information (UCI).

Figure 12:
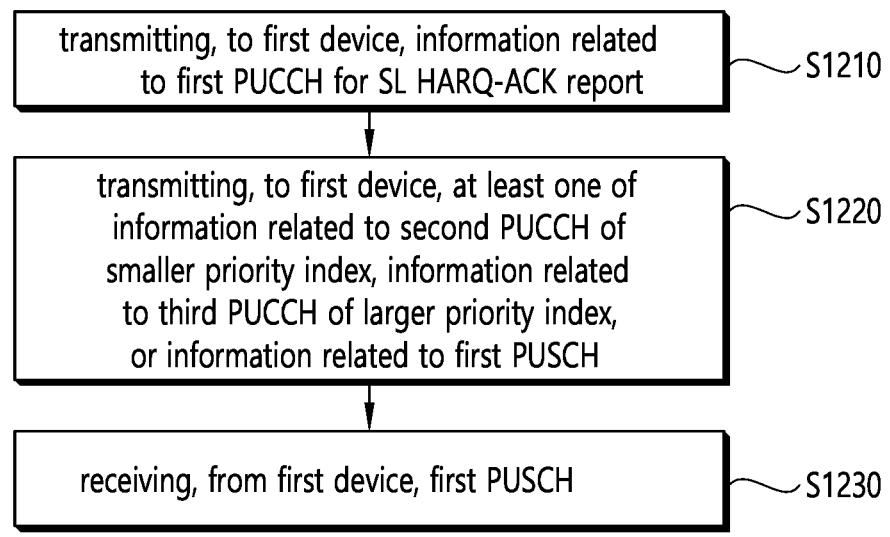
FIG. 12 shows a method for a base station to perform wireless communication, based on an embodiment of the present disclosure.

FIG. 12 shows a method for a base station to perform wireless communication, based on an embodiment of the present disclosure. The embodiment of FIG. 12 may be combined with various embodiments of the present disclosure.

Referring to FIG. 12, in step S1210, the base station may transmit, to a first device, information related to a first physical uplink control channel (PUCCH) for a sidelink (SL) hybrid automatic repeat request (HARQ)-acknowledgment (ACK) report. In step S1220, the base station may transmit, to the first device, at least one of information related to a second PUCCH of a smaller priority index, information related to a third PUCCH of a larger priority index, or information related to a first physical uplink shared channel (PUSCH). In step S1230, the base station may receive, from the first device, the first PUSCH. For example, based on overlapping for the first PUCCH and the second PUCCH of the smaller priority index, a procedure for prioritization between the first PUCCH and the second PUCCH may be performed by the first device. For example, based on overlapping for the first PUCCH and the third PUCCH of the larger priority index, a procedure for prioritization between the first PUCCH and the third PUCCH may be performed by the first device. For example, the first PUSCH may be selected by the first device in a procedure for resolving overlapping for at least one PUCCH without a SL HARQ-ACK report or at least one PUSCH. For example, after resolving the overlapping for the at least one PUCCH without the SL HARQ-ACK report or the at least one PUSCH, the first PUCCH and the first PUSCH may overlap. For example, based on the first PUSCH of the smaller priority index which includes no uplink control information (UCI), the SL HARQ-ACK report may be transmitted to the base station through the first PUSCH.

The proposed method can be applied to the device(s) based on various embodiments of the present disclosure. First, the processor 202 of the base station 200 may control the transceiver 206 to transmit, to a first device, information related to a first physical uplink control channel (PUCCH) for a sidelink (SL) hybrid automatic repeat request (HARQ)-acknowledgment (ACK) report. In addition, the processor 202 of the base station 200 may control the transceiver 206 to transmit, to the first device, at least one of information related to a second PUCCH of a smaller priority index, information related to a third PUCCH of a larger priority index, or information related to a first physical uplink shared channel (PUSCH). In addition, the processor 202 of the base station 200 may control the transceiver 206 to receive, from the first device, the first PUSCH. For example, based on overlapping for the first PUCCH and the second PUCCH of the smaller priority index, a procedure for prioritization between the first PUCCH and the second PUCCH may be performed by the first device. For example, based on overlapping for the first PUCCH and the third PUCCH of the larger priority index, a procedure for prioritization between the first PUCCH and the third PUCCH may be performed by the first device. For example, the first PUSCH may be selected by the first device in a procedure for resolving overlapping for at least one PUCCH without a SL HARQ-ACK report or at least one PUSCH. For example, after resolving the overlapping for the at least one PUCCH without the SL HARQ-ACK report or the at least one PUSCH, the first PUCCH and the first PUSCH may overlap. For example, based on the first PUSCH of the smaller priority index which includes no uplink control information (UCI), the SL HARQ-ACK report may be transmitted to the base station through the first PUSCH.

Based on an embodiment of the present disclosure, a base station configured to perform wireless communication may be provided. For example, the base station may comprise: one or more memories storing instructions; one or more transceivers; and one or more processors connected to the one or more memories and the one or more transceivers. For example, the one or more processors may execute the instructions to: transmit, to a first device, information related to a first physical uplink control channel (PUCCH) for a sidelink (SL) hybrid automatic repeat request (HARQ)-acknowledgment (ACK) report; transmit, to the first device, at least one of information related to a second PUCCH of a smaller priority index, information related to a third PUCCH of a larger priority index, or information related to a first physical uplink shared channel (PUSCH); and receive, from the first device, the first PUSCH. For example, based on overlapping for the first PUCCH and the second PUCCH of the smaller priority index, a procedure for prioritization between the first PUCCH and the second PUCCH may be performed by the first device. For example, based on overlapping for the first PUCCH and the third PUCCH of the larger priority index, a procedure for prioritization between the first PUCCH and the third PUCCH may be performed by the first device. For example, the first PUSCH may be selected by the first device in a procedure for resolving overlapping for at least one PUCCH without a SL HARQ-ACK report or at least one PUSCH. For example, after resolving the overlapping for the at least one PUCCH without the SL HARQ-ACK report or the at least one PUSCH, the first PUCCH and the first PUSCH may overlap. For example, based on the first PUSCH of the smaller priority index which includes no uplink control information (UCI), the SL HARQ-ACK report may be transmitted to the base station through the first PUSCH.

Based on an embodiment of the present disclosure, an apparatus configured to control a base station performing wireless communication may be provided. For example, the apparatus may comprise: one or more processors; and one or more memories operably connected to the one or more processors and storing instructions. For example, the one or more processors may execute the instructions to: transmit, to a first user equipment (UE), information related to a first physical uplink control channel (PUCCH) for a sidelink (SL) hybrid automatic repeat request (HARQ)-acknowledgment (ACK) report; transmit, to the first UE, at least one of information related to a second PUCCH of a smaller priority index, information related to a third PUCCH of a larger priority index, or information related to a first physical uplink shared channel (PUSCH); and receive, from the first UE, the first PUSCH. For example, based on overlapping for the first PUCCH and the second PUCCH of the smaller priority index, a procedure for prioritization between the first PUCCH and the second PUCCH may be performed by the first UE. For example, based on overlapping for the first PUCCH and the third PUCCH of the larger priority index, a procedure for prioritization between the first PUCCH and the third PUCCH may be performed by the first UE. For example, the first PUSCH may be selected by the first UE in a procedure for resolving overlapping for at least one PUCCH without a SL HARQ-ACK report or at least one PUSCH. For example, after resolving the overlapping for the at least one PUCCH without the SL HARQ-ACK report or the at least one PUSCH, the first PUCCH and the first PUSCH may overlap. For example, based on the first PUSCH of the smaller priority index which includes no uplink control information (UCI), the SL HARQ-ACK report may be transmitted to the base station through the first PUSCH.

Based on an embodiment of the present disclosure, a non-transitory computer-readable storage medium storing instructions may be provided. For example, the non-transitory computer-readable storage medium storing instructions, when executed, may cause a base station to: transmit, to a first device, information related to a first physical uplink control channel (PUCCH) for a sidelink (SL) hybrid automatic repeat request (HARQ)-acknowledgment (ACK) report; transmit, to the first device, at least one of information related to a second PUCCH of a smaller priority index, information related to a third PUCCH of a larger priority index, or information related to a first physical uplink shared channel (PUSCH); and receive, from the first device, the first PUSCH. For example, based on overlapping for the first PUCCH and the second PUCCH of the smaller priority index, a procedure for prioritization between the first PUCCH and the second PUCCH may be performed by the first device. For example, based on overlapping for the first PUCCH and the third PUCCH of the larger priority index, a procedure for prioritization between the first PUCCH and the third PUCCH may be performed by the first device. For example, the first PUSCH may be selected by the first device in a procedure for resolving overlapping for at least one PUCCH without a SL HARQ-ACK report or at least one PUSCH. For example, after resolving the overlapping for the at least one PUCCH without the SL HARQ-ACK report or the at least one PUSCH, the first PUCCH and the first PUSCH may overlap. For example, based on the first PUSCH of the smaller priority index which includes no uplink control information (UCI), the SL HARQ-ACK report may be transmitted to the base station through the first PUSCH.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 13:
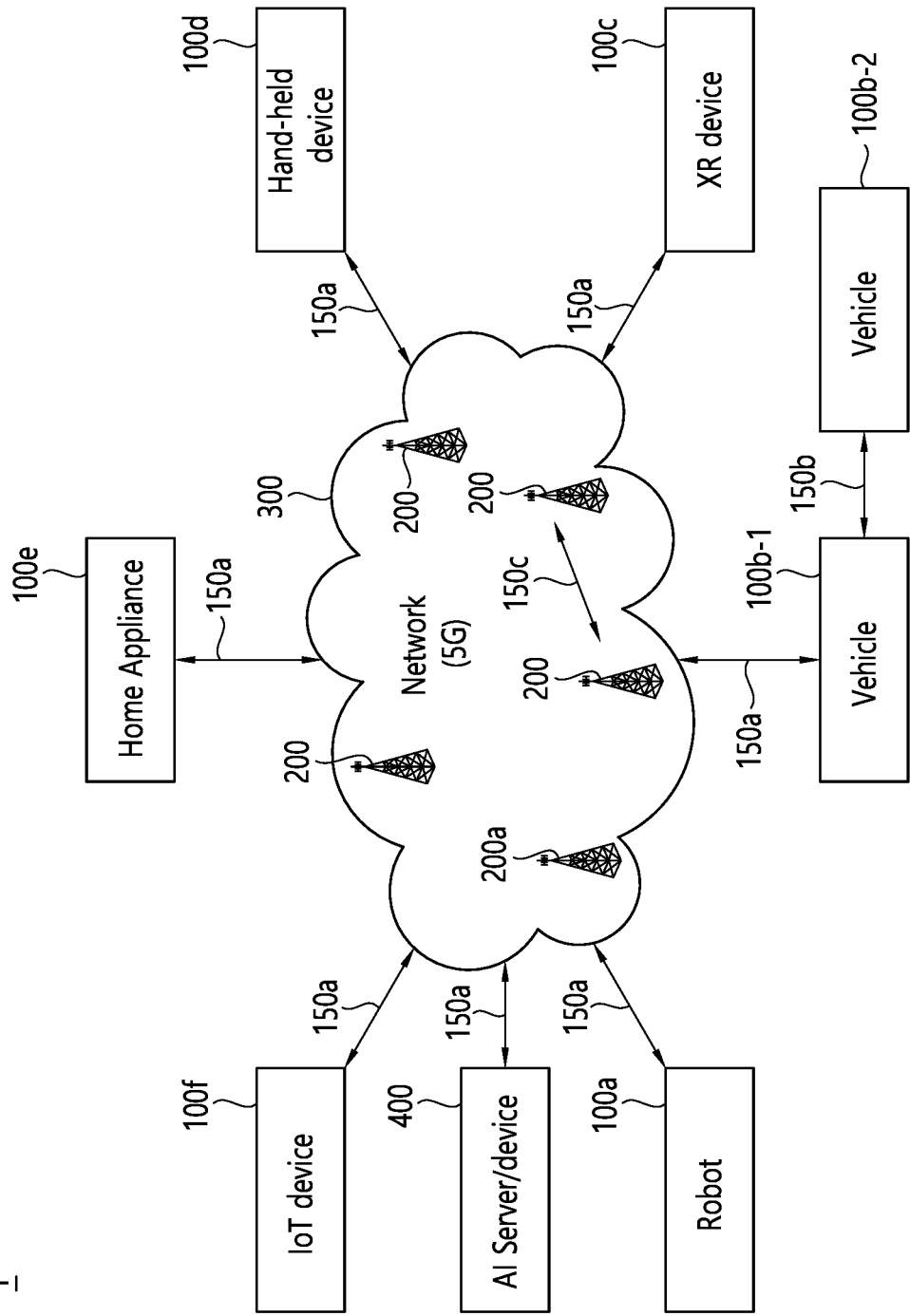
FIG. 13 shows a communication system 1, based on an embodiment of the present disclosure.

FIG. 13 shows a communication system 1, based on an embodiment of the present disclosure.

Referring to FIG. 13, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BS s/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 14:
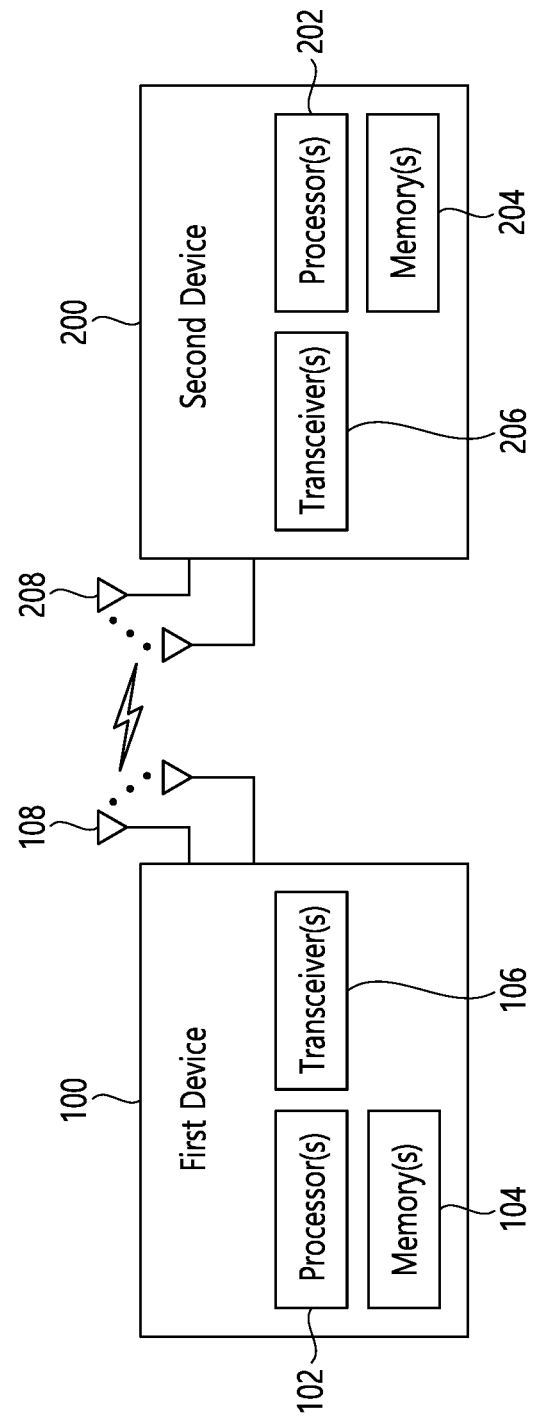
FIG. 14 shows wireless devices, based on an embodiment of the present disclosure.

FIG. 14 shows wireless devices, based on an embodiment of the present disclosure.

Referring to FIG. 14, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 13.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 15:
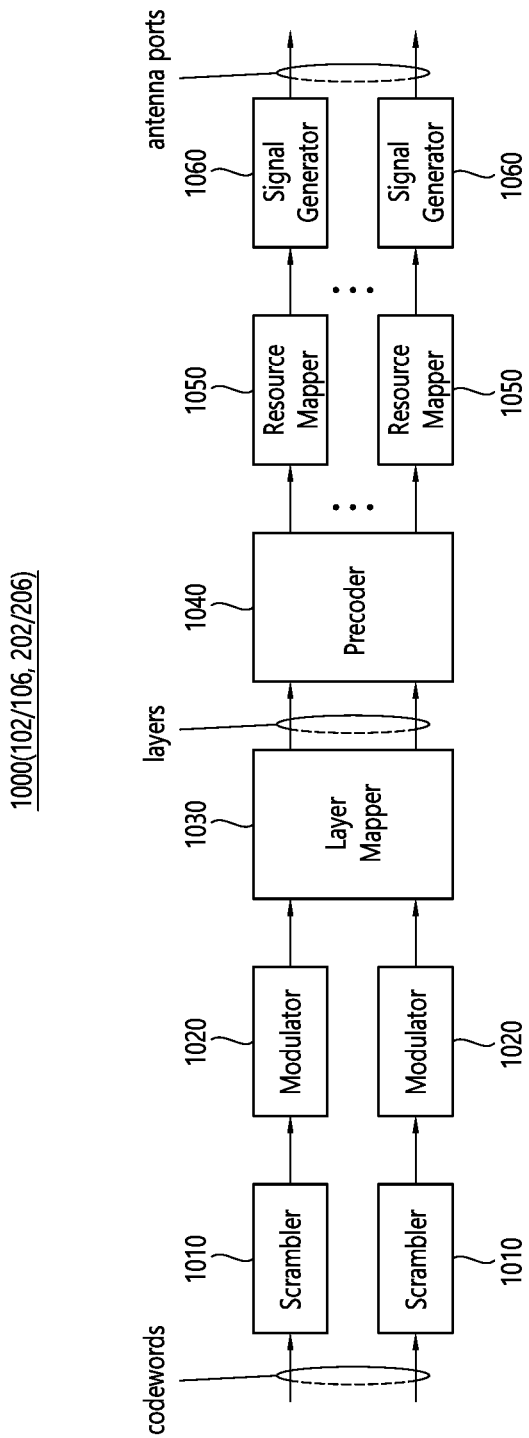
FIG. 15 shows a signal process circuit for a transmission signal, based on an embodiment of the present disclosure.

FIG. 15 shows a signal process circuit for a transmission signal, based on an embodiment of the present disclosure.

Referring to FIG. 15, a signal processing circuit 1000 may include scramblers 1010, modulators 1020, a layer mapper 1030, a precoder 1040, resource mappers 1050, and signal generators 1060. An operation/function of FIG. 15 may be performed, without being limited to, the processors 102 and 202 and/or the transceivers 106 and 206 of FIG. 14. Hardware elements of FIG. 15 may be implemented by the processors 102 and 202 and/or the transceivers 106 and 206 of FIG. 14. For example, blocks 1010 to 1060 may be implemented by the processors 102 and 202 of FIG. 14. Alternatively, the blocks 1010 to 1050 may be implemented by the processors 102 and 202 of FIG. 14 and the block 1060 may be implemented by the transceivers 106 and 206 of FIG. 14.

Codewords may be converted into radio signals via the signal processing circuit 1000 of FIG. 15. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 15. For example, the wireless devices (e.g., 100 and 200 of FIG. 14) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 16:
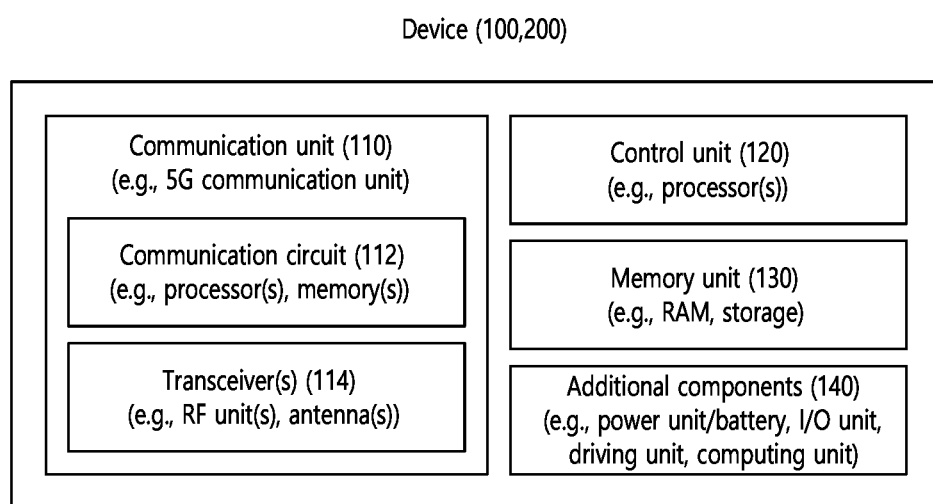
FIG. 16 shows another example of a wireless device, based on an embodiment of the present disclosure.

FIG. 16 shows another example of a wireless device, based on an embodiment of the present disclosure. The wireless device may be implemented in various forms according to a use-case/service (refer to FIG. 13).

Referring to FIG. 16, wireless devices 100 and 200 may correspond to the wireless devices 100 and 200 of FIG. 14 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 14. For example, the transceiver(s) 114 may include the one or more transceivers 106 and 206 and/or the one or more antennas 108 and 208 of FIG. 14. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 13), the vehicles (100*b*-1 and 100*b*-2 of FIG. 13), the XR device (100*c* of FIG. 13), the hand-held device (100*d* of FIG. 13), the home appliance (100*e* of FIG. 13), the IoT device (100*f* of FIG. 13), a digital broadcast terminal, a hologram device, a public safety device, an MTC device, a medicine device, a fintech device (or a finance device), a security device, a climate/environment device, the AI server/device (400 of FIG. 13), the BSs (200 of FIG. 13), a network node, etc. The wireless device may be used in a mobile or fixed place according to a use-example/service.

In FIG. 16, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 16 will be described in detail with reference to the drawings.

Figure 17:
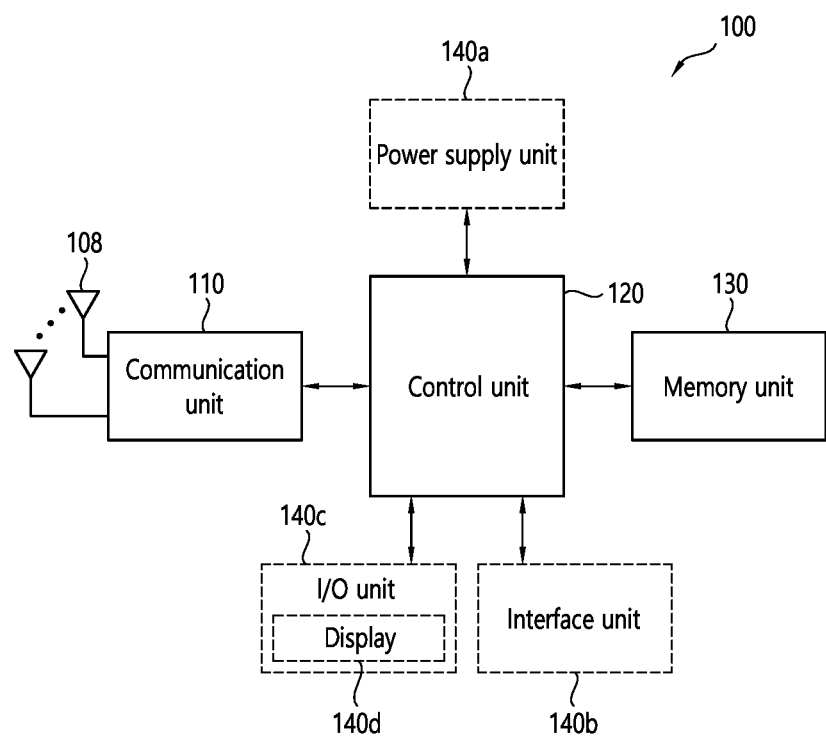
FIG. 17 shows a hand-held device, based on an embodiment of the present disclosure.

FIG. 17 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 17, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 16, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 18:
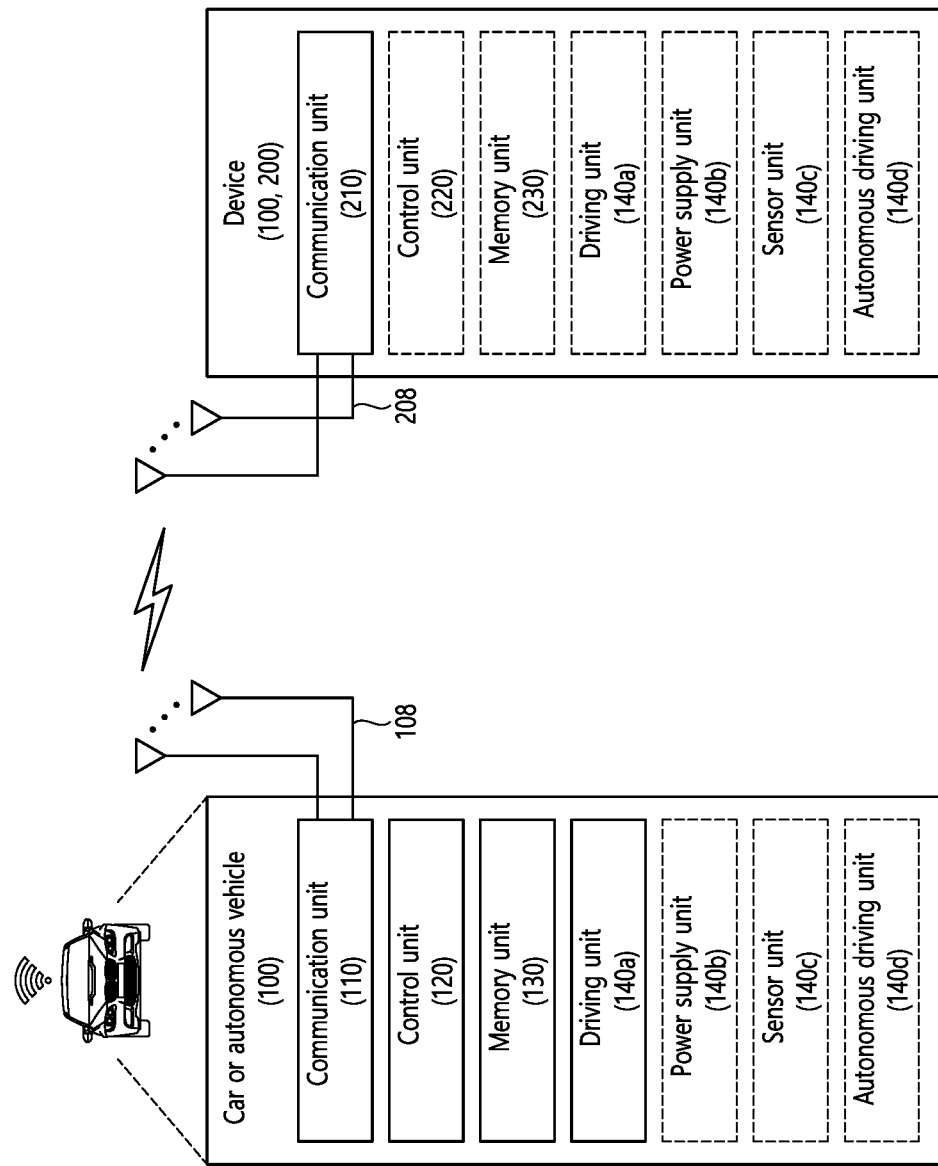
FIG. 18 shows a vehicle or an autonomous vehicle, based on an embodiment of the present disclosure.

FIG. 18 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 18, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 16, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing wireless communication by a first device, the method comprising:
   performing a physical sidelink shared channel (PSSCH) transmission to a second device;
   obtaining a sidelink (SL) hybrid automatic repeat request (HARQ)-acknowledgment (ACK) report for the PSSCH transmission;
   determining an overlapping between a physical uplink control channel (PUCCH) for the SL HARQ-ACK report and a PUCCH of smaller priority index, and an overlapping between the PUCCH for the SL HARQ-ACK report and a PUCCH of larger priority index;
   resolving the overlapping between the PUCCH for the SL HARQ-ACK report and the PUCCH of smaller priority index, and resolving the overlapping between the PUCCH for the SL HARQ-ACK report and the PUCCH of larger priority index, respectively;
   determining an overlapping between the PUCCH for the SL HARQ-ACK report and a physical uplink shared channel (PUSCH) of smaller priority index after resolving an overlapping between i) the PUSCH of smaller priority index and ii) a PUCCH without the SL HARQ-ACK report, wherein the PUSCH of smaller priority index includes no uplink control information (UCI); and
   transmitting, to a network, the PUSCH of smaller priority index comprising the SL HARQ-ACK report for resolving the overlapping between the PUCCH for the SL HARQ-ACK report and the PUSCH of smaller priority index.

2. The method of claim 1, wherein the SL HARQ-ACK report is multiplexed in the PUSCH of smaller priority index.

3. The method of claim 1, wherein the first device does not transmit the PUCCH for the SL HARQ-ACK report.

4. The method of claim 1, further comprising:
transmitting, by the first device to the network, a PUSCH of larger priority index.

5. The method of claim 1, wherein the PUCCH for the SL HARQ-ACK report is prioritized by the first device over the PUCCH of smaller priority index based on resolving the overlapping between the PUCCH for the SL HARQ-ACK report and the PUCCH of smaller priority index.

6. The method of claim 1, wherein the PUCCH for the SL HARQ-ACK report is prioritized by the first device over the PUCCH of larger priority index based on resolving the overlapping between the PUCCH for the SL HARQ-ACK report and the PUCCH of larger priority index.

7. The method of claim 1, wherein the PUCCH of smaller priority index and the PUCCH of larger priority index are partially or entirely overlapped with the PUCCH for the SL HARQ-ACK report in a time domain.

8. The method of claim 1, wherein the resolving of the overlapping between the PUCCH for the SL HARQ-ACK report and the PUCCH of smaller priority index is performed by the first device before resolving the overlapping between the PUSCH of smaller priority index and the PUCCH without the SL HARQ-ACK report.

9. The method of claim 1, wherein the resolving of the overlapping between the PUCCH for the SL HARQ-ACK report and the PUCCH of larger priority index is performed by the first device before resolving the overlapping between the PUSCH of smaller priority index and the PUCCH without SL HARQ-ACK report.

10. The method of claim 1, wherein a priority index of the PUCCH of smaller priority index is 0, and a priority index of the PUCCH of larger priority index is 1.

11. The method of claim 1, wherein a priority index of the PUSCH of smaller priority index is 0.

12. The method of claim 1, wherein the PUCCH of smaller priority index is related to an enhanced mobile broadband (eMBB) PUCCH, and the PUCCH of larger priority index is related to an ultra reliable low latency communications (URLLC) PUCCH.

13. The method of claim 1, wherein the PUSCH of smaller priority index is related to an enhanced mobile broadband (eMBB) PUSCH.

14. A first device configured to perform wireless communication, the first device comprising:
one or more memories storing instructions;
one or more transceivers; and
one or more processors connected to the one or more memories and the one or more transceivers, wherein the one or more processors execute the instructions to perform operations comprising:
performing a physical sidelink shared channel (PSSCH) transmission to a second device;
obtaining a sidelink (SL) hybrid automatic repeat request (HARQ)-acknowledgment (ACK) report for the PSSCH transmission;
determining an overlapping between a physical uplink control channel (PUCCH) for the SL HARQ-ACK report and a PUCCH of smaller priority index, and an overlapping between the PUCCH for the SL HARQ-ACK report and a PUCCH of larger priority index;
resolving the overlapping between the PUCCH for the SL HARQ-ACK report and the PUCCH of smaller priority index, and resolving the overlapping between the PUCCH for the SL HARQ-ACK report and the PUCCH of larger priority index, respectively;
determining an overlapping between the PUCCH for the SL HARQ-ACK report and a physical uplink shared channel (PUSCH) of smaller priority index after resolving an overlapping between i) the PUSCH of smaller priority index and ii) a PUCCH without the SL HARQ-ACK report, wherein the PUSCH of smaller priority index includes no uplink control information (UCI); and
transmitting, to a network, the PUSCH of smaller priority index comprising the SL HARQ-ACK report for resolving the overlapping between the PUCCH for the SL HARQ-ACK report and the PUSCH of smaller priority index.

15. The first device of claim 14, wherein the SL HARQ-ACK report is multiplexed in the PUSCH of smaller priority index.

16. The first device of claim 14, wherein the first device does not transmit the PUCCH for the SL HARQ-ACK report.

17. The first device of claim 14, wherein the operations further comprise transmitting, by the first device to the network, a PUSCH of larger priority index.

18. The first device of claim 14, wherein the PUCCH for the SL HARQ-ACK report is prioritized by the first device over the PUCCH of smaller priority index based on resolving the overlapping between the fPUCCH for the SL HARQ-ACK report and the PUCCH of smaller priority index.

19. The first device of claim 14, wherein the PUCCH for the SL HARQ-ACK report is prioritized by the first device over the PUCCH of larger priority index based on resolving the overlapping between the PUCCH for the SL HARQ-ACK report and the PUCCH of larger priority index.

20. An apparatus configured to control a first user equipment, UE, performing wireless communication, the apparatus comprising:
one or more processors; and
one or more memories operably connected to the one or more processors and storing instructions, wherein the one or more processors execute the instructions to perform operations comprising:
performing a physical sidelink shared channel (PSSCH) transmission to a second device;
obtaining a sidelink (SL) hybrid automatic repeat request (HARQ)-acknowledgment (ACK) report for the PSSCH transmission;
determining an overlapping between a physical uplink control channel (PUCCH) for the SL HARQ-ACK report and a PUCCH of smaller priority index, and an overlapping between the PUCCH for the SL HARQ-ACK report and a PUCCH of larger priority index;
resolving the overlapping between the PUCCH for the SL HARQ-ACK report and the PUCCH of smaller priority index, and resolving the overlapping between the PUCCH for the SL HARQ-ACK report and the PUCCH of larger priority index, respectively;
determining an overlapping between the PUCCH for the SL HARQ-ACK report and a physical uplink shared channel (PUSCH) of smaller priority index after resolving an overlapping between i) the PUSCH of smaller priority index and ii) a PUCCH without the SL HARQ-ACK report, wherein the PUSCH of smaller priority index includes no uplink control information (UCI); and
transmitting, to a network, the PUSCH of smaller priority index comprising the SL HARQ-ACK report for resolving the overlapping between the PUCCH for the SL HARQ-ACK report and the PUSCH of smaller priority index.

* * * * *